(12) United States Patent
Matsui et al.

(10) Patent No.: US 6,331,967 B1
(45) Date of Patent: Dec. 18, 2001

(54) DISK-ROTATION CONTROL APPARATUS

(75) Inventors: Shigeru Matsui; Noboru Yashima; Naoki Kizu; Kazuhiro Sugiyama; Yukari Hiratsuka, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/522,075

(22) Filed: Mar. 9, 2000

Related U.S. Application Data

(62) Division of application No. 09/058,844, filed on Apr. 13, 1998.

(30) Foreign Application Priority Data

Apr. 14, 1997 (JP) .................................................. 9-95843

(51) Int. Cl.[7] .................................................. G11B 7/00
(52) U.S. Cl. .................................... 369/47.03; 360/73.03
(58) Field of Search .............................. 369/50, 53, 54, 369/47.38, 47.42; 360/73.03

(56) References Cited

U.S. PATENT DOCUMENTS

| | | | | |
|---|---|---|---|---|
| 4,205,260 | * | 5/1980 | Maeda et al. .......................... | 318/318 |
| 4,390,977 | | 6/1983 | Onigata et al. . | |
| 4,928,044 | * | 5/1990 | Shiba .................... | 318/364 |
| 5,469,417 | * | 11/1995 | Tanoue et al. .................... | 369/500 R |
| 5,521,893 | * | 5/1996 | Yamasaki et al. .................... | 369/54 X |
| 5,528,573 | * | 6/1996 | Shim ................................ | 369/500 R |
| 5,537,375 | * | 7/1996 | Kobunaya .......................... | 369/50 X |
| 5,699,332 | * | 12/1997 | Nakano ................................ | 369/32 |
| 5,703,854 | * | 12/1997 | Kuroda et al. ...................... | 369/54 X |
| 5,751,676 | * | 5/1998 | Kusano et al. ...................... | 369/54 X |
| 5,825,732 | * | 10/1998 | Arataki .......................... | 360/73.03 X |
| 5,870,363 | * | 2/1999 | Sun et al. ................................ | 369/50 |
| 5,883,866 | * | 3/1999 | Shimizume et al. ............. | 369/500 R |

FOREIGN PATENT DOCUMENTS

| | | |
|---|---|---|
| 344994 A2 | 6/1989 | (EP) . |
| 628952 A2 | 12/1994 | (EP) . |
| 2279469 A | 4/1995 | (GB) . |
| 2302962 | 12/1990 | (JP) . |
| 6131667 | 5/1994 | (JP) . |
| 6338127 | 12/1994 | (JP) . |
| 0721678 | 1/1995 | (JP) . |
| 7240064 | 9/1995 | (JP) . |

* cited by examiner

Primary Examiner—Aristotelis M Psitos

(57) ABSTRACT

In a device for controlling rotation of a disk, if a determination is made that a signal is not normally detected by a pre-pit-region detection circuit, an error signal is obtained from a pulse generator to control the rotation of the disk. If a determination is made that a signal is normally detected by the pre-pit-region detection circuit and if the synchronizing signals are not normally detected at predetermined intervals, an error signal is obtained from the wobble signal so that the rotations of the disk are controlled. If a determination is made that synchronizing signals are detected by the pre-pit-region detection circuit at predetermined intervals, an error signal is obtained from clocks synchronized with the reproduced signal generated by the PLL circuit so that rotations of the disk are controlled.

10 Claims, 15 Drawing Sheets

DISK-ROTATION CONTROL APPARATUS

This application is a divisional of co-pending application Ser. No. 09/058,844, filed on Apr. 13, 1998, the entire contents of which are hereby incorporated by reference.

BACKGROUND OF THE INVENTION

The present invention relates to a digital-data recording and reproducing apparatus, and more particularly to a spindle-motor control circuit for rotating an optical disk or the like.

When tracking of a disk having digital signals recorded by a constant linear velocity (CLV) method is performed by using an optical pickup, the disk is rotated in such a manner that the rotational speed is lowered as the optical pickup is moved from the inner portion of the disk to the outer portion of the disk. The control of the rotational speed is performed by controlling the rotational speed of the spindle motor in such a manner that the frequency of synchronizing clocks (clocks generated by a phase locked loop circuit in accordance with the reproduced signal) synchronized with signals reproduced from the disk is made to be a predetermined frequency.

When any synchronizing signal cannot be obtained in the above-mentioned case, for example, when rotations of the motor have been started or when the optical pickup is moved at high speed, a maximum value (the longest inversion interval) in the interval from a rising edge of the reproduced signal from the disk to the falling edge of the same or the interval from the falling edge to the rising edge is detected. Then, the rotational speed of the spindle motor is controlled in such a manner that the longest inversion interval is made to be a predetermined value. The foregoing is disclosed in Postexamined Japanese Patent Publication No. 4-71269.

The magneto-optical disk or the like has wobbling (a zigzag guide groove or land) for use in tracking which is required when data is recorded or in detecting the recording position. Moreover, the minidisk (MD) includes address information in the wobbling portion. When the wobbling is used, also control of the rotations of the spindle motor can be performed. Such control will now be described in an example case of a DVD-RAM disk.

FIG. 15 is a block diagram showing a circuit for controlling a spindle motor adapted to a DVD-RAM disk. Reference numeral 1 represents a disk, 2 represents an optical pickup, 3 represents a spindle motor, 4 represents an operation amplifier for rotating the spindle motor, 5 represents an analog signal processing circuit for equalizing a reproduced signal and extracting a wobble signal, 6 represents a digital signal processing circuit for digital-processing the reproduced signal, 7 represents a channel-clock generating circuit for generating a channel clock for performing recording by multiplying the wobble signal, 8 represents a frequency comparator, 9 represents a phase comparator, 10 represents a calculator and 11 represents a PWM-signal generating circuit.

Operation of the circuit shown in FIG. 15 will now be described. When the disk 1 has been rotated by the operation amplifier 4 and thus a reproduced signal has been read by the optical pickup 2, a wobble signal is extracted by the analog signal processing circuit 5. Moreover, data in the reproduced signal is processed by the digital signal processing circuit 6 so as to be transmitted. Moreover, the extracted wobble signal is supplied to the channel-clock generating circuit 7; The channel-clock generating circuit 7 is, as shown in FIG. 16, in the form of a phase locked loop (PLL) circuit composed of a voltage control oscillator (VCO) 12, a frequency divider 13 for dividing the output signal from the VCO 12, a phase comparator 14 for subjecting the phases of the output of the frequency divider 13 and the supplied wobble signal to a comparison, a frequency comparator 15 and a low pass filter 16. The structure is shown in FIG. 16.

The operation of the channel-clock generating circuit 7 will now be described. Since the DVD-RAM disk is structured in such a manner that the channel clock (the clock for reading/writing data) is an integral multiple of the wobble signal, the clock transmitted from the VCO 12 is divided at a division ratio which corresponds to two times the division ratio of the frequency divider 13. Then, the output of the frequency divider 13 and the supplied wobble signal are supplied to the phase comparator 14 and the frequency comparator 15, respectively.

Since the frequency of the supplied wobble signal varies depending on the number of revolutions of the disk 1 and the reading position set to the optical pickup 2, the amount of the change is communicated from the phase comparator 14 as an error signal. Similarly, a phase difference component is communicated from the frequency comparator 15 as an error signal. The two error signals are added to each other, and then converted into an error voltage signal by charging/discharging a capacitor or the like by the low pass filter 16, the error voltage signal being supplied to the VCO 12. The oscillated frequency of the VCO 12 is changed to cancel the supplied error voltage. As described above, a closed loop is formed in which the clock transmitted from the VCO 12 is synchronized with the supplied wobble signal.

The clock synchronized with the supplied wobble signal and transmitted from the VCO 12 is divided to ½ by the frequency divider 13 so as to be fetched as a channel clock. The channel clock is supplied to the next frequency comparator 8. The channel clock is also employed as a clock for transmitting data to be recorded when a recording operation is performed.

On the other hand, the DVD-RAM disk is structured in such a manner that the frequency of the channel clock is 29.18MHz in a case where the disk 1 is rotated at constant linear velocity. Therefore, a clock having the above-mentioned frequency is, as a reference clock, supplied from a crystal oscillator or the like to the frequency comparator 8. The frequency comparator 8 subjects the channel clock fetched from the channel-clock generating circuit 7 and the frequency of the reference clock to a comparison so that a signal indicating the error in the frequency is transmitted.

The phase comparator 9 is, similarly to the frequency comparator 8, supplied with the reference clock having the frequency of 29.18 MHz from the crystal oscillator or the like. The reference clock is divided with the division ratio corresponding to ½ of the division ratio of the channel clock and the wobble signal in the frequency divider 13. The divided frequency of the clock is made to be the same as the frequency of the wobble signal when the disk 1 is rotated at constant linear velocity. The division signal and the wobble signal transmitted from the analog signal processing circuit 5 are subjected to a comparison by the phase comparator 9 so that a signal indicating the error in the phase is transmitted.

Both of the frequency error signal and the phase error signal are supplied to the calculator 10 so as to be multiplied with a real number so that the gain is adjusted. Then, the signals are added to each other, and then transmitted. The output of the error signal from the calculator 10 is supplied to the PWM-signal generating circuit 11 so as to be subjected to PWM (Pulse Width Modulation), and then supplied to the operation amplifier 4. Since the number of revolutions of the spindle motor 3 is controlled in such a manner that the error signal subjected to the PWM and transmitted from the operation amplifier 4 is canceled, the disk 1 is rotated at the constant linear velocity.

As described above, the rotations of the spindle motor 3 adapted to the DVD-RAM disk can be controlled by using the wobble signal. Therefore, an effective result can be obtained when data is recorded on the disk 1.

However, the clock synchronized with data can be obtained from the reproduced signal by a conventional PLL circuit adapted to data during the reproducing operation, furthermore accurate control can be performed. In this case, the frequencies or the phases of the synchronized clock and the reference clock (29.18 MHz) generated by the crystal oscillator or the like are subjected to a comparison to obtain an error signal so as to control the rotations of the spindle motor. Moreover, a countermeasure must be taken against a case in which the wobble signal is not supplied because of, for example, deviation of the optical pickup 2 from the track. Thus, the foregoing problems arise.

SUMMARY OF THE INVENTION

In view of the foregoing, an object of the present invention is to provide a disk-rotation control apparatus which is capable of performing optimum control by arbitrarily switching the methods for generating an error signal for use to control the spindle motor in accordance with whether or not a wobble signal can be detected or a state of synchronization between data which is being reproduced and the clock generated by the PLL circuit.

Another object of the present invention is to provide a disk-rotation control apparatus for controlling the rotations of a spindle motor by selecting a signal supplied to the PLL circuit by using a switching circuit, by generating a signal synchronized with each input by one PLL circuit and by subjecting the frequencies or he- phases to a comparison.

Another object of the present invention is to provide a disk-rotation control apparatus which inhibits recording if a wobble signal drops out at a recording operation or if a pre-pit data (address data previously recorded on the disk for recording data) cannot normally be obtained and which is capable of preventing a problem in that the writing address passes the reading address and thus a portion of data, which is being read, is deleted if the writing side (synchronized with the reproduced signal) and reading side (synchronized with the reference signal which does not depend on the reproduced signal) are not synchronized with each other when the reproduced signal is stored in a storage means, such as a memory.

According to the present invention, a disk-rotation control apparatus which controls rotations of a disk having a guide groove or land to reproduce the disk, comprises: a pulse generator for generating a pulse at every predetermined quantity of rotation; a guide detector for detecting a guide groove or land of the disk; synchronizing-signal detection means for detecting synchronizing signals from reproduction signals reproduced from the disk; and controller for controlling the rotation of the disk according to a signal from the pulse generator when the guide detector do not produce a signal, for controlling the rotation of the disk according to a signal from the guide detector when the guide detector produces a signal while the synchronizing signals are not detected, and for controlling the rotation of the disk according to the synchronizing signals which synchronize the reproduction signal when the synchronizing signals are detected.

According to one aspect of the present invention, there is provided a disk-rotation control apparatus comprising: a pulse generator for generating a pulse whenever the disk having a guide is rotated in a predetermined quantity; first control means which receives the pulse transmitted from the pulse generator so as to control the rotations of the disk; means for detecting the guide groove or land of the disk; second control means for controlling the rotations of the disk in response to the signal detected by the guide detection means; synchronizing-signal detection means for detecting synchronizing signals from signals reproduced from the disk; signal generating means for generating signals synchronized with the reproduced signals; third control means for controlling the rotations of the disk by using the signal generated by the signal generating means; first determination means for determining whether or not the synchronizing signals detected by the synchronizing-signal detection means are arranged at the same intervals; second determination means for determining whether or not the guide detection means is normally detecting signals; and selection means for selecting any one of the first to third control means in such a manner that when the second determination means has determined that signals are not normally detected by the guide detection means, the first control means is employed to control the rotations of the disk, when the second determination means has determined that signals are normally detected by the guide detection means and when the first determination means has determined that synchronizing signals are not detected at the predetermined intervals, the second control means is employed to control the rotations of the disk and when the first determination means has determined that the synchronizing signals are detected at the predetermined intervals, the third control means is employed to control the rotations of the disk.

According to another aspect of the present invention, there is provided a disk-rotation control apparatus, further comprising: reproduced-signal detection means for detecting the longest or shortest inversion interval or the longest or shortest period of the reproduced signal; fourth control means for controlling the rotations of the disk in accordance with a result of detection performed by the reproduced-signal detection means; third determination means for determining whether or not the reproduced signals are normally reproduced; and selection means for selecting any one of the first to fourth control means in such a manner that when the first determination means has determined that the synchronizing signals are not detected at predetermined intervals and when the third determination means has determined that the third determination means has determined that the reproduced signals have been reproduced, the fourth control means is employed to control the rotations of the disk, when the third determination means has determined that the reproduced signal is not reproduced and when the second determination means has determined that signals are normally detected by the guide detection means, the second control means is employed to control the rotations of the disk, when the second determination means has determined that signals are normally detected by the guide detection means, the second control means is employed to control the rotations of the disk and when the first determination means has determined that the synchronizing signals are detected at the predetermined intervals, the third control means is employed to control the rotations of the disk.

According to the present invention, a disk-rotation control apparatus which controls rotations of a disk having a guide groove or land to record data on the disk, comprises: a pulse generator for generating a pulse at every predetermined quantity of rotation; a guide detector for detecting a guide groove or land of the disk; and controller for controlling the rotation of the disk according to a signal from the guide detector when the guide detector produces a signal, and for controlling the rotation of the disk according to a signal from the pulse generator and for inhibiting data from recording to the disk when the guide detector do not produce a signal.

According to another aspect of the present invention, there is provided a disk-rotation control apparatus comprising: a pulse generator for generating a pulse whenever the disk is rotated in a predetermined quantity; first control means which receives the pulse transmitted from the pulse generator so as to control the rotations of the disk; guide detection means for detecting a signal from the guide groove or land; signal generating means for detecting a signal synchronized with the signal detected by the guide detection means; second control means for controlling the rotations of the disk in response to the signal generated by the signal generating means; determining means for determining whether or not signals are normally detected by the guide detection means; selection means for selecting the first or second control means in such a manner that when the determining means has determined that signals are not normally detected from the guide detection means, the first control means is employed to control the rotations of the disk and when the determining means has determined that signals are normally detected from the guide detection means, the second control means is employed to control the rotations of the disk; and third control means for inhibiting recording of data when the determining means has determined that signals are not detected normally from the guide detection means.

According to another aspect, there is provided a disk-rotation control apparatus comprising: guide detection means for detecting a signal from the guide groove or land; pre-recorded region detection means for detecting the pre-recorded region of the disk; synchronizing-signal detection means for detecting synchronizing signals from a reproduced signal from the pre-recorded region detected by the pre-recorded recorded region detection means; determining means for determining whether or not the synchronizing signals are arranged at predetermined intervals; first selection means for selecting the signal reproduced from the disk and the signal detected by the guide detection means; first signal generating means for generating a signal synchronized with the signal selected by the first selection means; control means for controlling the rotations of the disk by using the signal generated by the first signal generating means; second signal generating means for generating signals indicating the pre-recorded region and the recordable region by using the synchronizing signal detected by the synchronizing-signal detection means as a reference; and second selection means for selecting the signal generated by the second signal generating means and the signal detected by the pre-recorded region detection means and indicating the pre-recorded region.

According to another aspect of the present invention, there is provided a disk-rotation control apparatus comprising: guide detection means for detecting a signal from the guide groove or land; pre-recorded region detection means for detecting the pre-recorded region of the disk; synchronizing-signal detection means for detecting a synchronizing signal from a reproduced signal from the pre-recorded region detected by the pre-recorded region detection means; determining means for determining whether or not the synchronizing signals are arranged at predetermined intervals; first selection means for selecting the signal reproduced from the disk and the signal detected by the guide detection means; first signal generating means for generating a signal synchronized with the signal selected by the first selection means; control means for controlling the rotations of the disk by using the signal generated by the first signal generating means; second signal generating means for generating a signal indicating the pre-recorded region by using the synchronizing signal detected by the synchronizing-signal detection means as a reference; second selection means for selecting the signal generated by the second signal generating means and the signal detected by the pre-recorded region detection means and indicating the pre-recorded region; third signal generating means for generating a determination signal indicating the recordable region by using the synchronizing signal detected by the synchronizing-signal detection means as a reference; and recording means for transmitting data to be recorded on the disk by using the determination signal generated by the third signal generating means and indicating the recordable region as a reference.

According to another aspect of the present invention, there is provided a disk-rotation control apparatus which controls rotations of a disk to reproduce the disk, comprising: synchronizing-signal detection means for detecting a synchronizing signal, from a signal reproduced from the disk; signal generating means for generating a signal synchronized with the reproduced signal; frequency dividing means for dividing a reference signal into signals each having a predetermined frequency; frequency comparison means for subjecting the frequency generated by the signal generating means and a predetermined value to a comparison at each interval of the signals divided by the frequency dividing means; control means for controlling the rotations of the disk in accordance with an error signal obtained from the frequency comparison means; storage means having the reproduced signal stored thereon; a write address counter for giving an address for use when the reproduced signal is written on the storage means by using the synchronizing signal detected by the synchronizing-signal detection means as a reference; a read address counter for giving an address for use when a signal is read from the storage means; and correction means for correcting the error signal generated by the frequency comparison means when the difference between the count counted by the write address counter and that counted by the read address counter has been changed from a predetermined value.

According to another aspect of the present invention, there is provided a disk-rotation control apparatus arranged to interrupt rotation of a disk to reproduce the disk, comprising: signal generating means for generating a signal synchronized with a signal reproduced from the disk; frequency dividing means for dividing a reference signal into signals each having a predetermined frequency; means for measuring number of revolutions of the disk in such a manner as to measure the frequency of the signal generated by the signal generating means at each predetermined interval of the signals divided by the frequency dividing means and transmit a detection signal when the rotational speed of the disk has been made to be lower than a predetermined value; and disk by interruption means for measuring time required from start of the interruption operation to transmission of the detection signal from the means for measuring the number of revolutions of the disk so as to calculate interruption time for the disk from the measured time and transmit a predetermined interruption signal.

According to another aspect of the present invention, there is provided a disk-rotation control apparatus which is arranged to interrupt rotations of a disk to reproduce the disk having a guide groove or land, comprising: a pulse generator for generating a pulse whenever the disk is rotated in a predetermined quantity; means for detecting a guide groove or land of the disk; first signal generating means for generating a signal synchronized with the signal detected by the guide detection means; synchronizing-signal detection means for detecting a synchronizing signal from a synchronizing signal from a signal reproduced from the disk; a second signal generating means for generating a signal synchronized with the reproduced signal; first determination means for determining whether or not the synchronized signal detected by the synchronizing signal detection means are arranged at predetermined intervals; second determination means for determining whether or not signal is normally detecting by the guide detection means; frequency dividing means for dividing a reference signal into signals each having a predetermined frequency; first means for measuring the number of revolutions of the disk in such a manner as to measure the frequency of the signal generated by the first signal generating means at each predetermined interval of the signal divided by the frequency dividing means and transmit a detection signal when the rotational speed of the disk has been made to be lower than a predetermined value; second means for measuring the number of revolutions of the disk in such a manner as to measure the frequency of the signal generated by the second signal generating means at each predetermined interval of the signal divided by the frequency dividing means and transmit a detection signal when the rotational speed of the disk has been made to be lower than a predetermined value; third means for measuring the number of revolutions in such a manner as to measure the pulses transmitted from the pulse generator at each predetermined interval of the signal divided by the frequency dividing means and transmit a detection signal when the rotational speed of the disk has been made to be lower than a predetermined value; first disk interrupting means for measuring time required from start of an interrupting operation to transmission of the detection signal from the first means for measuring the number of revolutions of the disk and calculating interruption time of the disk from the measured time so as to transmit a predetermined interruption signal; second disk interrupting means for measuring time required from start of the interrupting operation to transmission of the detection signal from the second means for measuring the number of revolutions of the disk and calculating interruption time of the disk from the measured time so as to transmit a predetermined interruption signal; third disk interruption means for measuring time required from start of the interrupting operation to transmission of the detection signal from the third means for measuring the number of revolutions of the disk and calculating interruption time of the disk from the measuring time so as to transmit a predetermined interruption signal; and selection means for selecting any one of the first to third interrupting means in such a manner that when the second determination means has determined that the signal is not detected by the guide detection means, the third interrupting means is employed to interrupt the rotation of the disk, when the second determination means has determined that the signal is normally detected by the guide detection means and when the first determination means has determined that the synchronizing signals are not detected at the same intervals, the first interrupting means is employed to interrupt the rotation of the disk and when the first determination means has determined that the synchronizing signals are detected at predetermined intervals, the second interrupting means is employed to interrupt the rotation of the disk.

The disk-rotation control apparatus according to the first embodiment of the present invention is structured in such a manner that when the second determination means has determined that signals are not normally detected by the guide detection means, the first control means is selected by the selection means to control the rotations of the disk. When the second determination means has determined that signals are normally detected by the guide detection means and when the first determination means has determined that synchronizing signals are not detected at the predetermined intervals, the second control means is selected by the selection means to control the rotations of the disk. When the first determination means has determined that the synchronizing signals are detected at the predetermined intervals, the third control means is selected by the selection means to control the rotations of the disk.

The disk-rotation control apparatus according to a second embodiment of the present invention is structured in such a manner that when the first determination means has determined that the synchronizing signals are not detected at predetermined intervals and when the third determination means has determined that the reproduced signals have been reproduced, the fourth control means is selected by the selection means to control the rotations of the disk. When the third determination means has determined that the reproduced signal is not reproduced and when the second determination means has determined that signals are normally detected by the guide detection means, the second control means is selected by the selection means to control the rotations of the disk.

The disk-rotation control apparatus according to a third embodiment of the present invention is structured in such a manner that when the determining means has determined that signals are not normally detected from the guide detection means, the first control means is selected by the selection means to control the rotations of the disk. When the determining means has determined that signals are normally detected from the guide detection means, the second control means is selected by the selection means to control the rotations of the disk. When the determining means has determined that signals are not detected normally from the guide detection means, the third control means inhibits recording of data to be recorded.

The disk-rotation control apparatus according to a fourth embodiment of the present invention is structured in such a manner that when the determining means has determined that the synchronizing signals are not detected at predetermined intervals, the second selection means selects the signal detected by the pre-recorded region detection means and indicating the pre-recorded region. When the determining means has determined that the sychronizing signals are detected at the predetermined intervals, the signal generated by the second signal generating means is selected. The reproduced signal is selected by the first selection means in the region indicated by the signal generated by the second signal generating means and selected by the second selection means or the region indicated by the signal detected by the pre-recorded region detection means and indicating the prerecorded region. Moreover, the signal detected by the guide detection means is selected in the other regions.

The disk-rotation control apparatus according to a fifth embodiment of the present invention is structured in such a manner that when the determining means has determined that the synchronizing signals are not detected at predetermined intervals, the signal indicating the pre-recorded region detected by the pre-recorded region detection means is selected by the second selection means. When the determining means has determined that the synchronizing signals are detected at the predetermined intervals, the determination signal generated by the second signal generating means is selected. The reproduced signal is selected by the first selection means in the region indicated by the determination signal generated by the second signal generating means and selected by the second selection means or the region indicated by the signal detected by the pre-recorded region detection means and indicating the pre-recorded region. Moreover, the signal detected by the guide detection means is selected in the other regions. When the determining means has determined that the synchronizing signals are not detected at the predetermined intervals, the recording operation of the recording means is inhibited.

The disk-rotation control apparatus according to a sixth embodiment of the present invention is structured in such a manner that when the difference between the count of the write address counter and that of the read address counter has been changed from a predetermined value, the correction means corrects the error signal of the frequency comparison means. Thus, the control operation of the control means is corrected. Therefore, the rotations of the disk are changed, and the updating speed of the write address counter is changed. Thus, control is performed in such a manner that the difference in the count obtained by the comparison means is restored to the predetermined value.

The disk-rotation control apparatus according to a seventh embodiment of the present invention is structured in such a manner that when the rotation of the disk is interrupted, the means for measuring number of revolutions measures the frequency of the signal generated by the signal generating means at each predetermined interval of the signals divided by the frequency dividing means. Moreover, a detection signal is transmitted when the rotational speed of the disk has been made to be lower than a predetermined value. The disk interruption means measures time required from start of the interruption operation to transmission of the detection signal from them means for measuring the number of revolutions of the disk so as to calculate interruption time for the disk from the measured time and transmit a predetermined interruption signal. Thus, rotations of the disk are interrupted.

The disk-rotation control apparatus according to an eighth embodiment of the present invention is structured in such a manner that when the second determination means has determined that the signal is not detected normally by the guide detection means, the third interrupting means is employed by the selection means to interrupt the rotation of the disk. When the second determination means has determined that the signal is normally detected by the guide detection means and when the first determination means has determined that the synchronizing signals are not detected at the same intervals, the first interrupting means is employed by the selection means to interrupt the rotation of the disk. When the first determination means has determined that the synchronizing signals are detected at predetermined intervals, the second interrupting means is employed by the selection means to interrupt the rotation of the disk.

DETAILED DESCRIPTION OF THE PREFERRED EMBODIMENTS

Embodiments of the present invention will now be described with reference to the drawings.

First Embodiment

Figure 1:
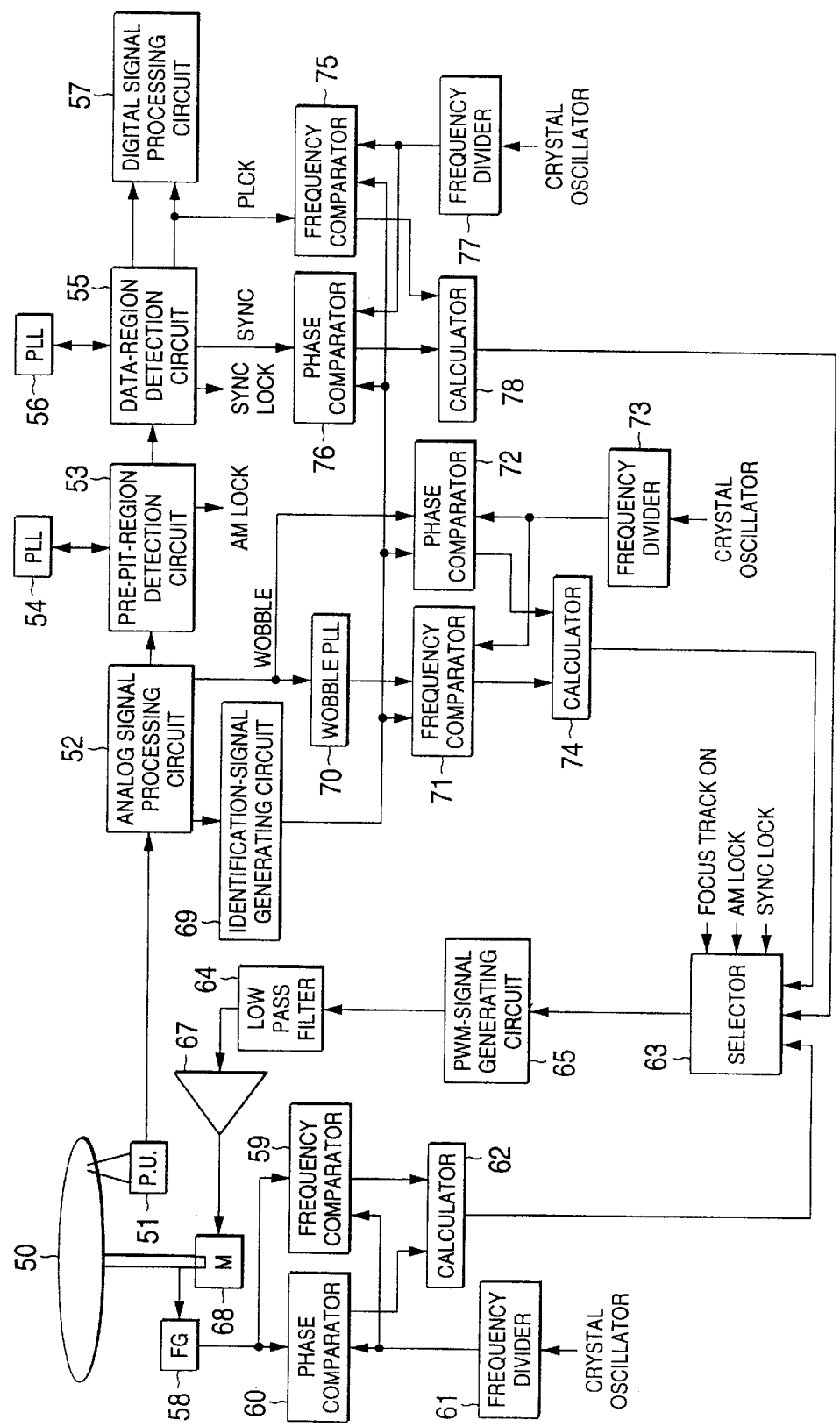
FIG. 1 is a block diagram showing a first embodiment of a disk-rotation control apparatus according to the present invention.

FIG. 1 is a block diagram showing a first embodiment of a disk-rotation control apparatus according to the present invention. Reference numeral 50 represents a DVD-RAM disk on which a wobble signal has been recorded. Reference numeral 51 represents an optical pickup and 52 represents an analog signal processing circuit for equalizing a reproduced signal and extracting the wobble signal. Reference numeral 53 represents a pre-pit-region detection circuit for detecting data in a pre-pit region (a read-only region having data pits previously formed on the disk 50 and similar to those formed on the DVD-ROM) and a synchronizing signal. Reference numeral 54 represents a PLL circuit for generating a clock synchronized with data detected by the pre-pit-region detection circuit 53. Reference numeral 55 represents a data-region detection circuit for detecting data in the data region (a region formed on the disk 50 and having a wobble groove or land to permit data reading and writing) and a synchronizing signal. Reference numeral 56 represents a PLL circuit for generating a clock synchronized with data detected by the data-region detection circuit 55. Reference numeral 57 represents a digital signal processing circuit for receiving data detected by the data-region detection circuit 54 and the clock generated by the PLL circuit 56 to subject a signal process.

Reference numeral 68 represents a spindle motor and 58 represents a pulse generator for transmitting a plurality of pulses whenever the spindle motor 68 is rotated by one time. Reference numeral 59 represents a frequency comparator and 60 represents a phase comparator. Reference numeral 61 represents a frequency divider for dividing the clock supplied from a crystal oscillator or the like. Reference numeral 62 represents a calculator, 63 represents a selector, 64 represents a low pass filter, 65 represents a PWM-signal generating circuit and 67 represents an operation amplifier for the spindle motor.

Reference numeral 69 represents an identification-signal generating circuit for generating an identification signal for distinguishing the pre-pit region and the data region from each other. Reference numeral 70 represents a PLL circuit for generating a channel clock by multiplying the wobble signal. Reference numeral 71 represents a frequency comparator, 72 represents a phase comparator, 73 represents a frequency divider for dividing the clock supplied from a crystal oscillator or the like and 74 represents a calculator.

Reference numeral 75 represents a frequency comparator, 76 represents a phase comparator, 77 represents a frequency divider for dividing the clock supplied from a crystal oscillator or the like and 78 represents a calculator.

Figure 2:
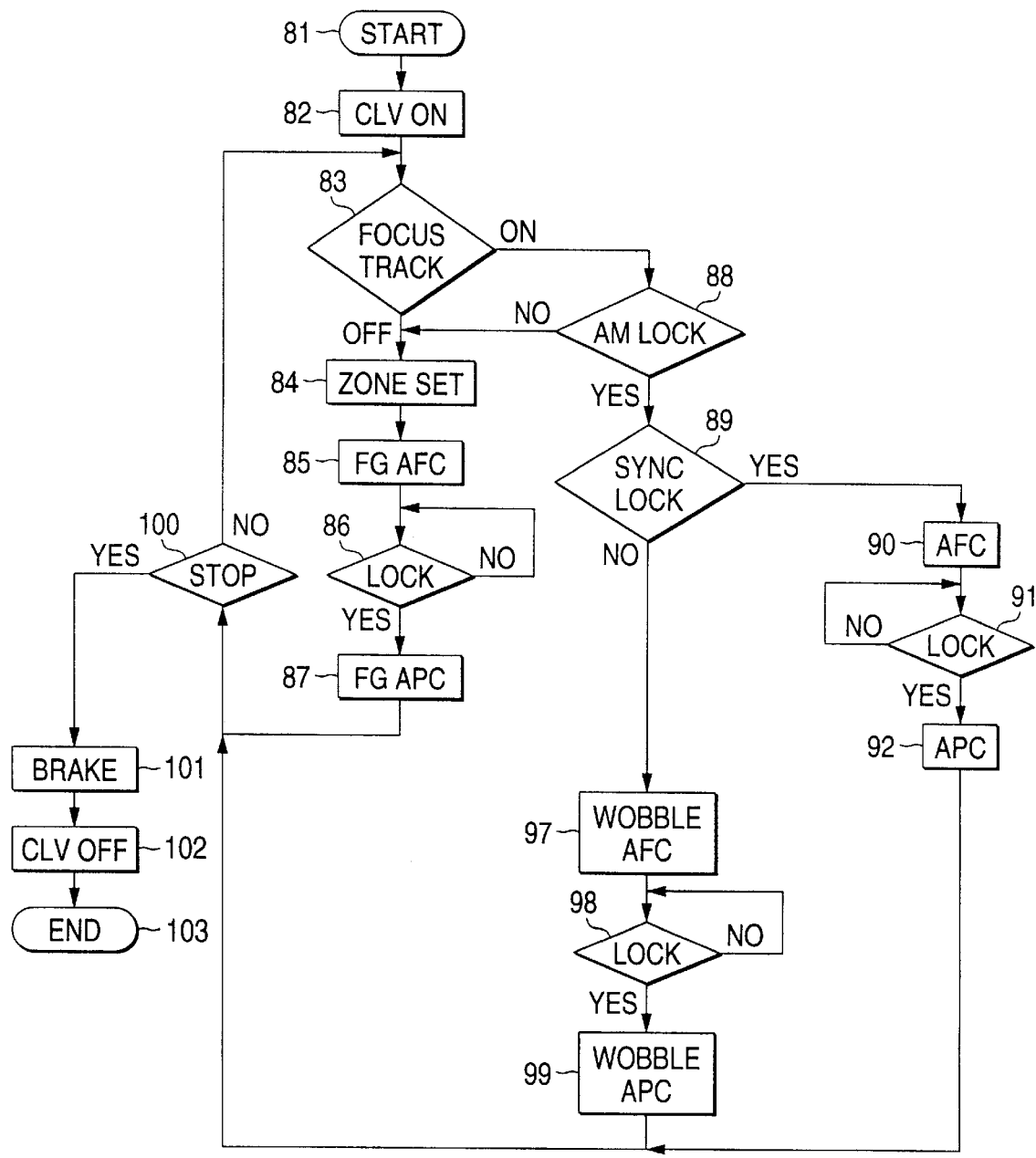
FIG. 2 is a flow chart of the operation of the first embodiment of the disk-rotation control apparatus.

The operation will now be described. FIG. 2 is a flow chart for operating the spindle motor 68 shown in block diagram of FIG. 1. Referring to FIG. 2, the operation will now be described.

Initially, initialization is performed in START 81, and then the disk 50 starts rotations at CLV in CLVON 82. Then, CHECK 83 of focusing and track servo states of the optical pickup 51 is performed. If the reproduced signal cannot normally be read because of the operation start or deviation of focusing and the track servo, a spindle control using the spindle motor 68 is performed. Since the DVD-RAM is structured in such a manner that an approximate number of revolutions of the disk is determined for each zone (a small concentric region on the disk 50), a predetermined division ratio corresponding to the number of revolutions of the region which is reproduced in ZONE SET 84 is set to the frequency divider 61. Assuming that the frequency of the crystal oscillator or the like which is supplied to the frequency divider 61 is f, the number of revolutions of the disk 50 in the predetermined zone is n and the number of pulses which are transmitted from the pulse generator for each rotation of the disk 50 is k, the division ratio M can be obtained as follows:

$$M = nk/f \quad (1)$$

Then, an output signal from the frequency divider 61 is used as a reference so that the number of pulses supplied from the pulse generator 58 is measured by the frequency comparator 59 in FG AFC 85. If the disk 50 is being rotated at a predetermined number of revolutions, the number of clocks from the frequency divider 61 for each rotation and the above-mentioned number of pulses are the same. If they are not the same, an error is made. The frequency comparator 59 transmits the number of the error pulses generated in each rotation or during a predetermined number of revolutions.

In LOCK 86, the state of the frequency comparator 59 is always investigated. If the number of the error pulses is smaller than a predetermined number (when the number of revolutions of the disk 50 has approached the predetermined value determined for each zone), the operation proceeds to FG APC 87 so that the phase comparator 60 subjects the phase of the output signal from the frequency divider 61 and that of the output timing of the pulse which is transmitted from the pulse generator to a comparison. If the phase of the timing of the output pulse and that of the output signal from the frequency divider 61 are not synchronized with each other, an amount of the error is measured and transmitted.

Then, both of the output of the frequency comparator 59 and that from the phase comparator 60 are supplied to the calculator 62 so that each output is multiplied with a real number to adjust the gain, and then added to each other. An output indicating the amount of the error obtained by the addition is supplied to the selector 63. If the disk 50 is not interrupted in STOP 100, the output indicating the amount of the frequency and phase errors in the calculator 62 are selected and supplied to the PWM-signal generating circuit 65 in a case where focusing and the track servo are deviated as a result of the investigation of focusing the track servo in CHECK 83. Then, the amount of the error is subjected to PWM, and modulated value is transmitted. The output is supplied to the low pass filter 64 so that high frequency components of the signal are removed.

FIG. 1 shows the structure formed on an assumption that the low pass filter 64 is an analog circuit. Therefore, the PWMsignal generating circuit 65 performs the PWM, and then output is performed. The low pass filter 64 may be composed of a digital filter. In this case, the PWM-signal generating circuit 65 is not required (the operation for converting the amount of error into change in the time axis is performed by the digital filter when the PWM is performed).

Then, the output of the low pass filter 64 is supplied to the amplifier 67 so that the spindle motor 68 is controlled in such a manner that the frequency and phase errors are canceled. If the output has no frequency and phase error, the disk 50 is being rotated at a predetermined number of revolutions for each zone. As a result of the above-mentioned operation, the disk 50 is controlled at the CAV (Constant Angular Velocity). Therefore, excessive rotation, interruption and reverse rotation of the disk 50 which take place when no reproduced signal is supplied in a case where focusing or the track servo is deviated can be prevented.

Then, focusing or the track servo is performed so that a state is realized in which the reproduced signal can be read. In this state, an output signal from the optical pickup 51 is supplied to the analog signal processing circuit 52 so as to be subjected to a data equalizing process and a binary-coding process. Then, the processed signal is supplied to the pre-pit-region detection circuit 53. As a result, data and a synchronizing signal in the pre-pit region are detected. In the PLL circuit 54, a clock having the phase synchronized with that of data is generated in accordance with the synchronizing signal. The clock having the synchronized phase is used when data in the pre-pit region is read. Read data is transmitted to the outside of the apparatus so as to mainly be used as address information on the disk 50.

Since the synchronizing signals have been recorded on the disk 50 at predetermined data intervals, the pre-pit-region detection circuit 53 measures the intervals of the synchronizing signals with the clock generated by the PLL circuit 54. Thus, also CHECK 88 is performed whether or not the period of time from detection a certain synchronizing signal to detection of a next synchronizing signal is a period of time corresponding to a predetermined number of clocks. If the period of time does not correspond to the predetermined number of clocks, a determination is performed that the synchronizing signal in the pre-pit region has not been reproduced or another determination is performed that the phase of the output clock from the PLL circuit 54 has not been synchronized. Thus, the operation is returned to the spindle control (CAV) which is performed when focusing or the track servo is deviated.

When the reproduced signal transmitted from the analog signal processing circuit 52 through the pre-pit-region detection circuit 53 is supplied to the data-region detection circuit 55, data and the synchronizing signal in the data region are detected. Moreover, the PLL circuit 56 generates a clock having the phase synchronized with that of data in response to the synchronizing signal. Data detected by the data-region detection circuit 55 and the clock generated by the PLL circuit 56 are supplied to the digital signal processing circuit 57 so that modulation of data, an error correction process and the like are performed.

If the foregoing process is performed in such a manner that synchronizing signals in the pre-pit region are detected at predetermined intervals of the clocks, the data-region detection circuit 55 measures the intervals between the synchronizing signals with the clock generated by the PLL circuit 56 because also the synchronizing signals in the data region are recorded on the disk 50 at predetermined intervals of data. Thus, CHECK 89 is performed in such a manner that a period of time from detection of a certain synchronizing signal to detection of a next synchronizing signal is the period of time corresponding to a predetermined number of clocks. If the period of time does not correspond to the predetermined number of clocks, a determination is made that data is not recorded in the data region or the phase of the clock transmitted from the PLL circuit 56 is not synchronized. Thus, the spindle motor 68 is controlled with the wobble signal similarly to the conventional structure. Then, the operation proceeds to WOBBLE AFC 97.

When the wobble signal is extracted by the analog signal processing circuit 52, the extracted wobble signal is supplied to the PLL circuit 70. As described in the prior art, a clock having the phase synchronized with that of the wobble signal is supplied from the PLL circuit 70 to the following frequency comparator 71. Moreover, the clock is also used as a clock for transmitting data to be recorded when a recording operation is performed. Since the DVD-RAM is structured in such a manner that the frequency of the data reading clock when the disk 50 is rotated at constant linear velocity is 29.18 MHz, a clock having the above-mentioned frequency is, as a reference clock, supplied from a crystal oscillator or the like to the frequency comparator 71. The frequency comparator 71 subjects the frequency of the above-mentioned clock and that of the reference clock to a comparison so that a frequency error signal is transmitted.

In LOCK 98, the state of the frequency comparator 71 is always checked. When the error signal is not higher than a predetermined value (when the frequency of the output clock from the PLL circuit 70 has approached the above-mentioned frequency of the reference clock), the operation proceeds to WOBBLE APC 99. On the other hand, the frequency divider 73 is supplied with a reference clock having the frequency of 29.18 MHz from the crystal oscillator or the like, similarly to the frequency comparator 71. The reference clock is divided with a division ratio corresponding to the division ratio of the clock and the wobble signal transmitted from the PLL circuit 70 (the frequency of the divide clock is made to be the same as the frequency of the wobble signal in a case where the disk 50 is being rotated at constant linear velocity). Then, the phase comparator 72 subjects the phase of the output signal from the frequency divider 73 and that of the output timing of the wobble signal extracted by the analog signal processing circuit 52 are subjected to a comparison. If the phase of the timing of the wobble signal and that of the output signal from the frequency divider 73 are not synchronized with each other, the amount of the error is measured so as to be transmitted as a phase error signal.

Both of the frequency error signal and the phase error signal are supplied to the calculator 74 so as to be multiplied with a real number and subjected to a gain adjustment. Then, the signals are added to each other so as to be transmitted. The output of the calculator 74 is supplied to the selector 63. If the state in which the disk 50 is not interrupted in STOP 100, focusing or the track servo is performed so that data in the pre-pit region can normally be read. If data is not recorded on the data region, the frequency and phase errors transmitted from the calculator 74 are selected by the selector 63 so as to be supplied to the PWM-signal generating circuit 65. The amount of the error is subjected to PWM so as to be removed.

When the low pass filter 64 is composed of a digital filter, the operation for converting the amount of the error into change in the time axis by performing the PWM is performed by the digital filter. Therefore, the PWM-signal generating circuit 65 is not required.

Then, the output of the low pass filter 64 is supplied to the operation amplifier 67 so that the spindle motor 68 is controlled in such a manner that the frequency and phase errors are canceled. If no frequency and phase error exists, the phase of the reproduced wobble signal is synchronized with that of the reference clock. Therefore, the disk 50 is controlled at the constant linear velocity (CLV). Therefore, when reproduction of the portion on the data region on which data has been recorded is started, a state is realized in which the phases of the PLL circuit 56 and the like can easily be synchronized.

Since no wobble signal is recorded on the pre-pit region of the disk 50 and thus the wobble signal cannot be obtained because the foregoing region is being reproduced, the reproduced signal is supplied from the analog signal processing circuit 52 to the identification-signal generating circuit 69. Then, a signal for distinguishing the pre-pit region and the data region from each other is transmitted. At this time, the comparing operations of the frequency comparator 71 and the phase comparator 72 are changed, interrupted or stopped in accordance with the identification signal. In the case of the pre-pit region, the error signal obtained immediately before the output of the pre-pit region identification signal is stored and transmitted. When the data-region identification signal is transmitted, the comparing operation is restarted so as to transmit an error signal. Thus, a malfunction can be prevented even if the wobble signal cannot be obtained.

In the pre-pit region, the output clock from the PLL circuit 54 may be supplied to the frequency comparator 71 in place of the output clock from the PLL circuit 70. Moreover, the output clock from the PLL circuit 54 may be divided with the same division ratio as that of the frequency divider 73 so as to be supplied to the phase comparator 72 in place of the wobble signal to cause the phase comparator 72 to continue the comparing operation.

In the pre-pit region, only the frequency comparator 71 may be caused to perform the comparing operation by using the output clock from the PLL circuit 54. On the other hand, the phase comparator 72 may store the output of the error signal as described above. In this case, an influence (the phase of the wobble signal and that of the divided clock of the PLL circuit 54 are not synchronized with each other) exerted due to rapid change in the output of the phase error which is made in their boundaries can be prevented.

The intervals of the synchronizing signals detected by the data-region detection circuit 55 are measured with the clocks generated by the PLL circuit 56. Then, CHECK 89 is performed whether or not the period of time from detection of a certain synchronizing signal to detection of a next synchronizing signal is a period of time corresponding to a predetermined number of clocks. If the period of time corresponds to the predetermined number of clocks, the phase of the clock is synchronized with the phase of data in the data region. Thus, the spindle motor 68 is controlled in accordance with the foregoing clocks.

In the foregoing case, the operation proceeds to AFC 90 so that the clocks generated by the PLL circuit 56 and having the phases synchronized with those of data in the data region generated in the PLL circuit 56 are supplied to the frequency comparator 75. The frequency of the clocks for reading data from the DVD-RAM is 29.18 MHz when the disk 50 is rotated at the constant linear velocity. Therefore, the clocks having the above-mentioned frequency are, as reference clocks, supplied from the crystal oscillator or the like to the frequency comparator 75. The frequency comparator 75 subjects the frequency of the clocks transmitted from the PLL circuit 56 and the frequency of the reference clock to a comparison so that a frequency error signal is transmitted.

In LOCK 91, the state of the frequency comparator 75 is always checked. If the amount of error indicated by the foregoing error signal is smaller than a predetermined value (if the frequency of the output clock from the PLL circuit 56 approaches the frequency of the reference clock), the operation proceeds to APC 92. On the other hand, similarly to the frequency comparator 75, the frequency divider 77 is supplied with the reference clock having the frequency of 29.18 MHz from the crystal oscillator or the like. Assuming that the period of the synchronizing signal detected by the data-region detection circuit 55 is p and the period of the output clock signal from the PLL circuit 56 is q, the division ratio R can be obtained as follows:

$$R=q/p \tag{2}$$

The frequency of the reference clock is, by the frequency divider 77, divided with the division ratio corresponding to the above-mentioned division ratio R (the period of the divided clock is made to be the same as the period of the above-mentioned synchronizing signal in a case where the disk 50 is rotated at the constant linear velocity). Then, the phase comparator 76 subjects the phase of the output signal from the frequency divider 77 and that of the output timing of the synchronizing signal detected by the data-region detection circuit 55 to a comparison. If the phase of the timing of the foregoing synchronizing signal and that of the output signal from the frequency divider 77 are not synchronized with each other, the amount of error is measured s-o as to be transmitted as a phase error signal.

Both of the frequency error signal and the phase error signal are supplied to the calculator 78 so as to be multiplied with a real number and subjected to gain adjustment, and then transmitted. The output of the calculator 78 is supplied to the selector 63. If a state in which the disk 50 is interrupted is not realized in STOP 100, focusing or the track servo is performed so that data in the pre-pit region can normally be read. If data is recorded on the data region and the phase of the clocks of the PLL circuit 56 and the phase of data in the data region are synchronized with each other (in a usual data reproduction state), the frequency and the output of the phase error of the calculator 78 are selected by the selector 63 so as to be supplied to the PWM-signal generating circuit 65. The amount of the error is subjected to PWM so as to be transmitted. The output is supplied to the low pass filter 64 so that the high frequency component of the signal is removed.

When the low pass filter 64 is composed of the digital filter as described above, the operation for converting the amount of the error into the time axis change by performing the PWM is carried out by the digital filter. Therefore, the PWM-signal generating circuit 65 is not required. Then, the output of the low pass filter 64 is supplied to the amplifier 67 so that the spindle motor 68 is controlled in such a manner that the frequency and phase errors are canceled. The above-mentioned control method is the method which is selected when a usual data reproduction operation is performed.

When the spindle motor 68 is controlled by using the clocks having the phases synchronized with reproduced data in both pre-pit region and the data region, the clocks which are supplied to the frequency comparator 75 can be switched between the output from the PLL circuit 54 and that of the PLL circuit 56 in accordance with the output of the identification signal from the identification-signal generating circuit 69. The synchronizing signal which is supplied to the phase comparator 76 can be switched between the output of the pre-pit-region detection circuit 53 and the output of the data-region detection circuit 55.

When the disk 50 is brought to the stop state in STOP 100 as a result of the above-mentioned process, the operation proceeds to BRAKE 101 so that a brake signal is supplied from the selector 66 to the amplifier 67 through the low pass filter 64. When the disk 50 has been stopped, the brake signal is suspended in CLV OFF 102 so that the operation proceeds to END 103.

Since the first embodiment of the present invention is operated as described above, the disk 50 is controlled at the CLV with the clocks having the phases synchronized with that of data in the data region during a usual reproduction operation. If the phase of the clocks does not synchronized with data, the disk 50 is controlled by-the inversion intervals of data. The portion in which data in the data region drops out or no data is recorded is controlled in accordance with the wobble signal. When focusing or the track servo is deviated, the CAV control using the pulse generator 58 is performed. Therefore, the spindle motor can appropriately be controlled in accordance with the state of reproduction of the disk 50.

Second Embodiment

Figure 3:
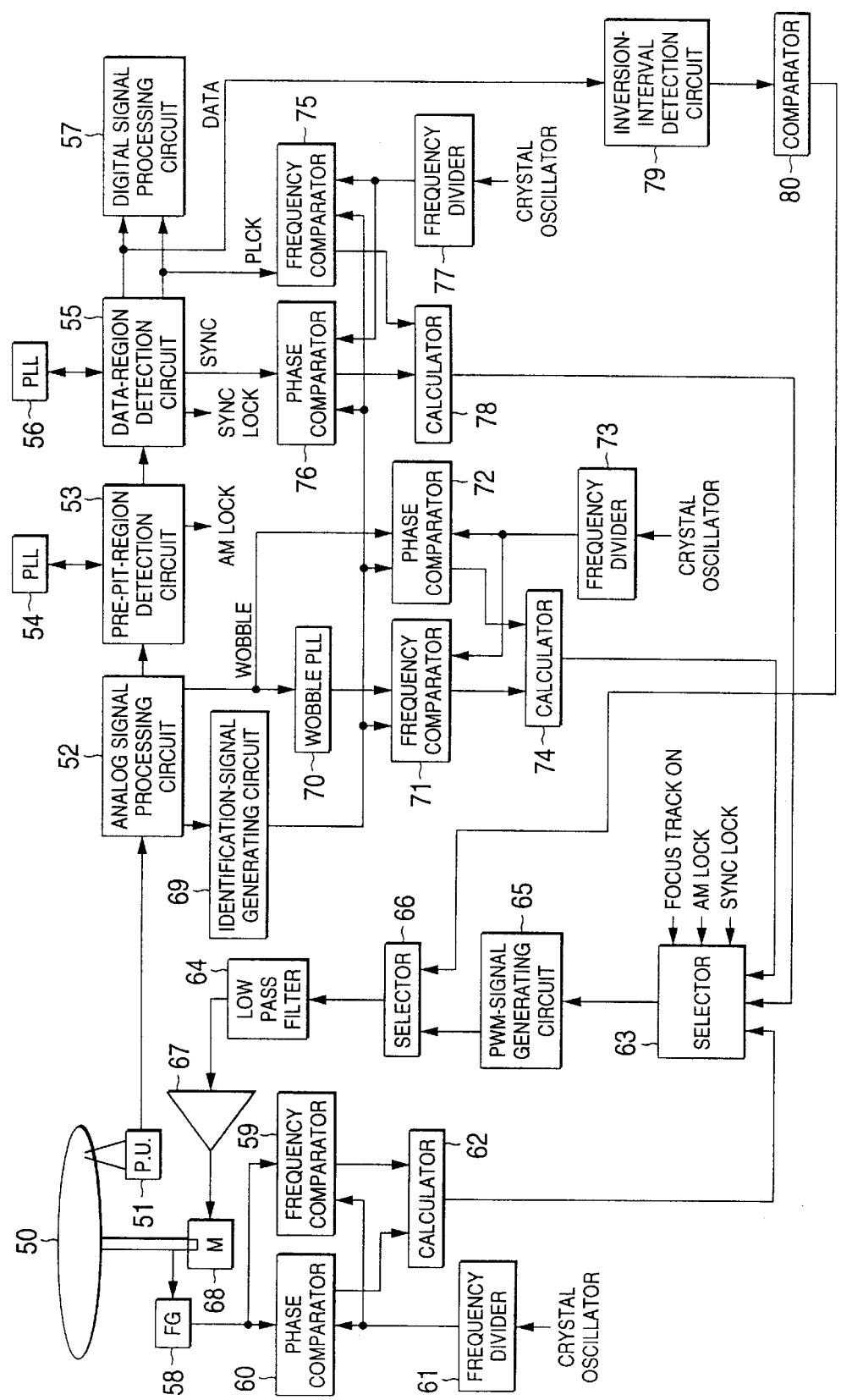
FIG. 3 is a block diagram showing a second embodiment of the disk-rotation control apparatus according to the present invention.

FIG. 3 is a block diagram showing a second embodiment of the disk-rotation control apparatus according to the present invention. The same reference numeral as those shown in FIG. 1 represent the same or corresponding elements. Reference numeral 66 represents a selector, 79 represents an inversion interval detection circuit and 80 represents a comparator.

Figure 4:
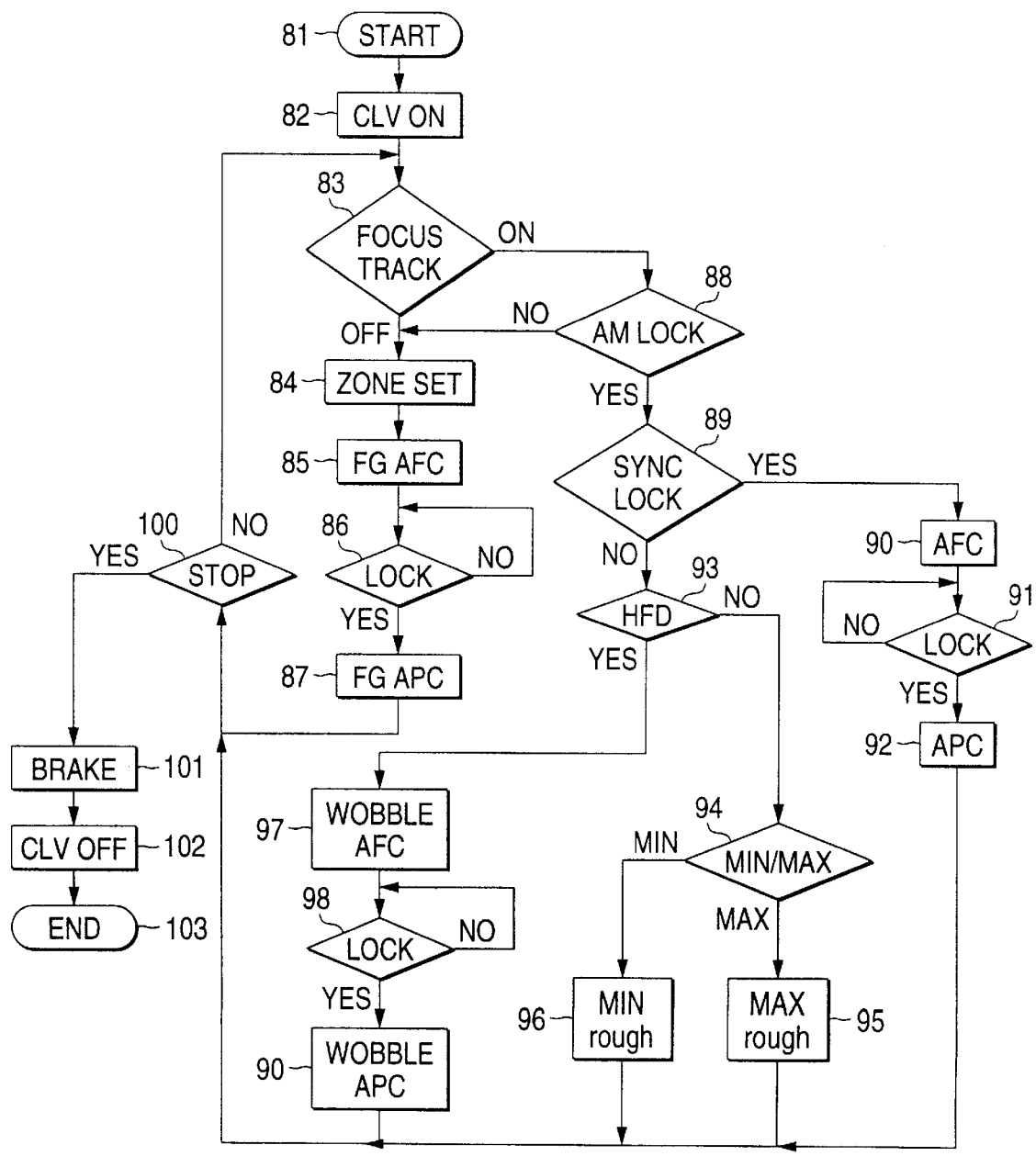
FIG. 4 is a flow chart of the operation of the second embodiment of the disk-rotation control apparatus.

Referring to a flow chart shown in FIG. 4, the operations of the elements different from those according to the first embodiment will now be described. As shown in FIG. 4, if data is recorded on the data region and thus a reproduced signal exist as a result of CHECK 93 in which the existence of the reproduced signal is checked, the operation proceeds to MIN/MAX 94. Since the phase of the output clocks from the PLL circuit 56 has not been synchronized with that of data in the data region, the inversion intervals of data in the data region are used to control the spindle motor 68. If the longest inversion interval is employed in MIN/MAX 94 because of setting, the operation proceeds to MAX 95. If the shortest inversion interval is employed, the operation proceeds to MIN 96. When the longest inversion interval is employed, the longest inversion interval of the signal in a predetermined period of time is detected after the reproduced signal from the data region has been supplied from the data-region detection circuit 55 to the inversion interval detection circuit 79.

Since the longest inversion interval is generated when the synchronizing signal has been reproduced, the synchronizing signal must be reproduced in the predetermined detection period. When the inversion interval is detected from rising edge of the signal to the falling edge of the same or from the falling edge to the falling edge, an influence exerted from change in the data slice (binary coding) level in the analog signal processing circuit 52 can be reduced as compared with the detection from the rising edge of the signal to the falling edge. The foregoing fact has been disclosed in Japanese Patent Publication No. 4-71269.

The maximum value of the inversion interval detected by the inversion interval detection circuit 79 is supplied to the comparator 80 so as to be subjected to a comparison with the maximum value of the inversion interval realized when the disk 50 is rotated at constant linear velocity. If the inversion interval detected by the inversion interval detection circuit 79 is shorter, the comparator 80 transmits a signal for decelerating the spindle motor 68. If the inversion interval is longer, the comparator 80 transmits a signal for accelerating the spindle motor 68. The signal is supplied to the amplifier 67 through the elector 66 (if data is recorded in the data region and thus a reproduced signal exists as a result of the check whether or not a reproduced signal exist in CHECK 93, the output of the comparator 80 is selected) and the low pass filter 64. Thus, the spindle motor 68 is controlled. In this case, the spindle motor 68 is controlled by the constant linear velocity (CLV) method in accordance with data in the data region. Therefore, the spindle motor 68 can furthermore precisely be controlled as compared with the control which is performed in response to the wobble signal.

If the shortest inversion interval is employed, the shortest inversion interval of the signal in the predetermined period is detected when a reproduced signal of the data region has been supplied from the data-region detection circuit 55 to the inversion interval detection circuit 79. The comparator 80 subjects the shortest inversion interval and the minimum value of the shortest inversion interval which is realized when the disk 50 is rotated at constant linear velocity to a comparison.

When the foregoing control is performed in such a manner that the spindle motor 68 is controlled by detecting the inversion interval of data in each of the pre-pit region and the data region, the signal which is supplied to the inversion interval detection circuit 79 can be switched between the output of the pre-pit-region detection circuit 53 and the output of the data-region detection circuit 55 in accordance with the identification signal transmitted from the identification-signal generating circuit 69.

When the inversion interval is detected in the pre-pit region or the data region, the portion which does not detect the inversion interval in accordance with the identification signal transmitted from the identification-signal generating circuit 69 is brought to a state in which the signal for controlling the spindle motor 68 is not supplied from the comparator 80. As an alternative to this, the comparator 80 is not selected by the selector 66.

Third Embodiment

Figure 5:
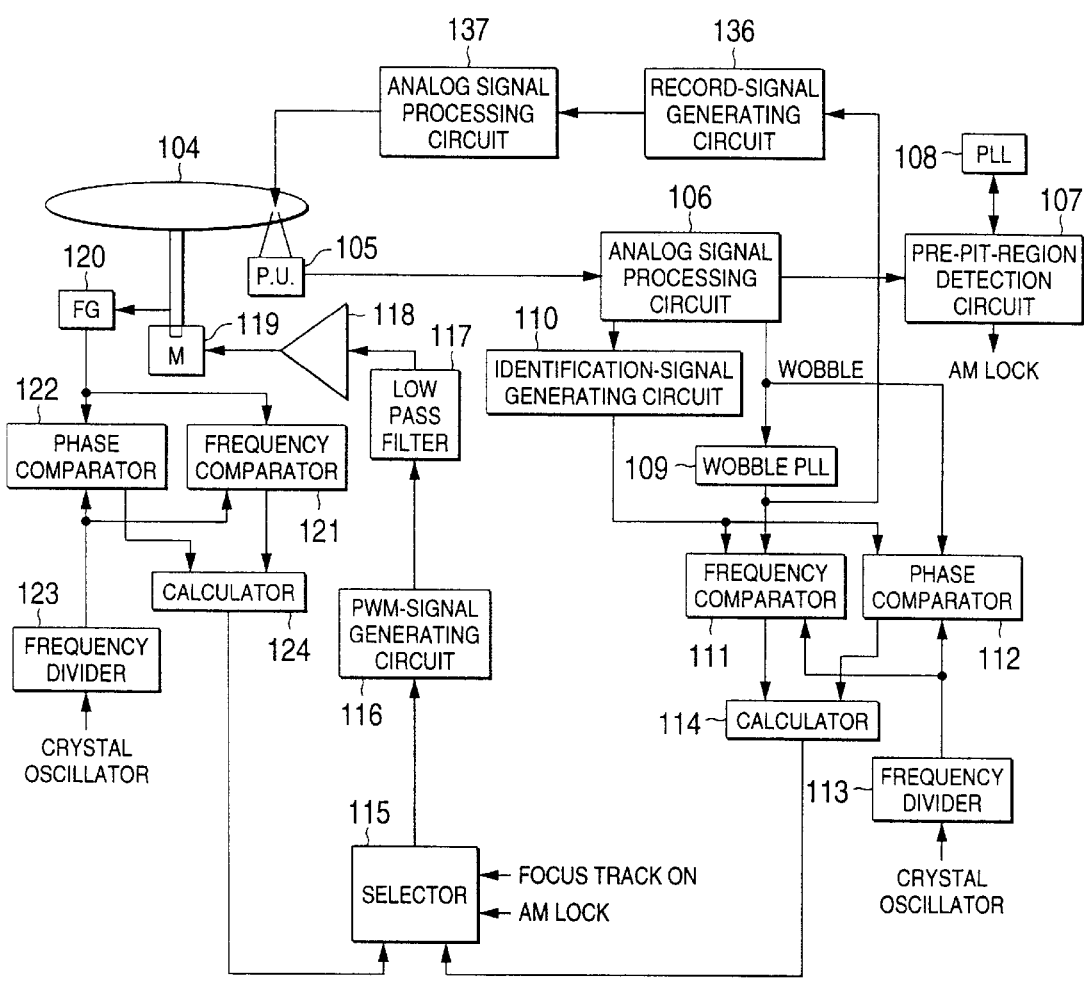
FIG. 5 is a block diagram showing a third embodiment of the disk-rotation control apparatus according to the present invention.

FIG. 5 is a block diagram showing a third embodiment of the disk-rotation control apparatus according to the present invention. Referring to FIG. 5, reference numeral 104 represents a DVD-RAM disk on which a wobble signal has been recorded, 105 represents a magneto-optical head and 106 represents an analog signal processing circuit for equalizing a reproduced signal and extracting the wobble signal. Reference numeral 107 represents a circuit for detecting data in the pre-pit region (a read-only region having data pits previously formed on the disk 104 similarly to the DVD-RAM) and the synchronizing signal and 108 represents a PLL circuit for generating clocks synchronized with data detected by the pre-pit-region detection circuit 107. Reference numeral 119 represents a spindle motor and 120 represents a pulse generator for transmitting a plurality of pulses whenever the spindle motor 119 is rotated one time. Reference numeral 121 represents a frequency comparator, 122 represents a phase comparator and 123 represents a frequency divider for dividing the frequency of the clocks supplied from a crystal oscillator or the like. Reference numeral 124 represents a calculator, 115 represents a selector, 117 represents a low pass filter, 116 represents a PWM-signal generating circuit and 118 represents an operation amplifier for rotating the spindle motor. Reference numeral 110 represents an identification-signal generating circuit for generating identification signals for distinguishing the pre-pit region and the data region from each other. Reference numeral 109 represents a PLL circuit for generating channel clocks by multiplying the wobble signal, 111 represents a frequency comparator and 112 represents a phase comparator. Reference numeral 113 represents a frequency divider for dividing the frequency of the clocks supplied from a crystal oscillator or the like. Reference numeral 114 represents a calculator.

Figure 6:
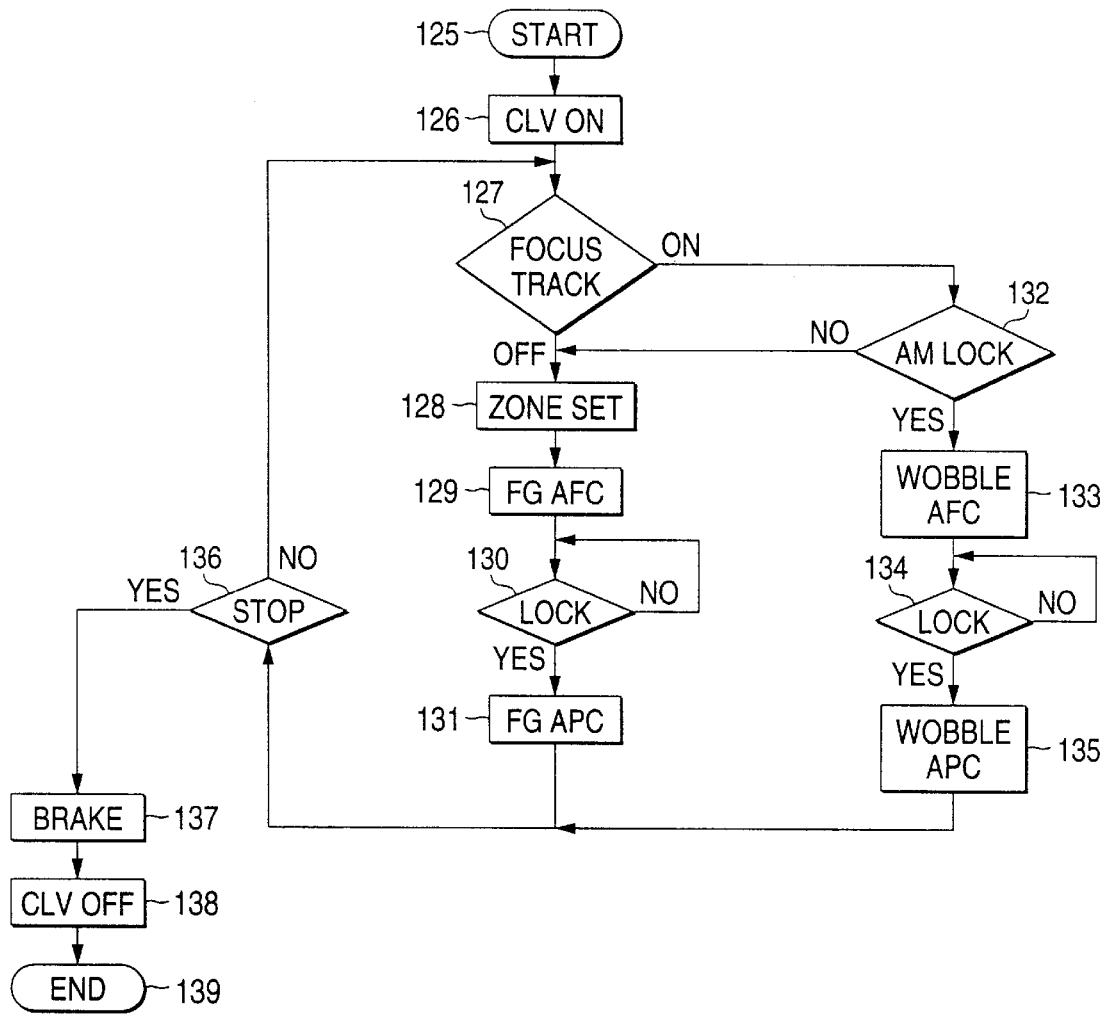
FIG. 6 is a flow chart of the operation of the third embodiment of the disk-rotation control apparatus.

The operation will now be described. FIG. 6 is a flow chart for operating the spindle motor 119 shown in FIG. 5 which is a block diagram. Referring to FIG. 6, the operation will now be described.

Initially, initialization is performed in START 125, and then the disk 104 starts rotations at CLV in CLVON 126. Then, CHECK 127 of the focusing and track servo states of the optical pickup 105 is performed. If the reproduced signal cannot normally be read because of start of the operation or deviation of focusing and the track servo, a spindle control using the spindle motor 120 is performed. Since the DVD-RAM is structured in such a manner that an approximate number of revolutions of the disk is determined for each zone (a small concentric region on the disk 104), a predetermined division ratio corresponding to the number of revolutions of the region which is reproduced in ZONE SET 128 is set to the frequency divider 123. The division ratio M can be obtained by the above-mentioned Equation (1).

Then, an output signal from the frequency divider 123 is used as a reference so that the number of pulses supplied from the pulse generator 120 is measured by the frequency comparator 121 in FG AFC 129. If the disk 104 is being rotated at a predetermined number of revolutions, the number of clocks from the frequency divider 123 for each rotation and the above-mentioned number of pulses are the same. If they are not the same, an error is made. The frequency comparator 121 transmits the number of the error pulses generated in each rotation or during a predetermined number of revolutions.

In LOCK 130, the state of the frequency comparator 121 is always investigated. If the number of the error pulses is smaller than a predetermined number (when the number of revolutions of the disk 104 has approached the predetermined value determined for each zone), the operation proceeds to FG APC 131 so that the phase comparator 122 subjects the phase of the output signal from the frequency divider 123 and that of the output timing of the pulse which is transmitted from the pulse generator 120 to a comparison. If the phase of the timing of the output pulse and that of the output signal from the frequency divider 123 are not synchronized with each other, an amount of the error is measured and transmitted.

Then, both of the output of the frequency comparator 121 and that from the phase comparator 122 are supplied to the calculator 124 so that each output is multiplied with a real number to adjust the gain, and then added to each other. An output indicating the amount of the error obtained by the addition is supplied to the selector 115. If the disk 104 is not interrupted in STOP 136, the frequency and the output indicating the amount of the frequency and phase errors in the calculator 124 are selected and supplied to the PWM-signal generating circuit 116 in a case where focusing and the track servo are deviated as a result of investigations of focusing or the track servo in CHECK 127. Then, the amount of the error is subjected to PWM, and modulated value is transmitted. The output is supplied to the low pass filter 117 so that high frequency components of the signal are removed.

FIG. 5 shows the structure formed on an assumption that the low pass filter 117 is an analog circuit. Therefore, the PWM-signal generating circuit 116 performs the PWM, and then output is performed. The low pass filter 117 may be composed of a digital filter. In this case, the PWM-signal generating circuit 116 is not required because the operation for converting the amount of error into change in the time axis is performed by the digital filter when the PWM is performed.

Then, the output of the low pass filter 117 is supplied to the amplifier 118 so that the spindle motor 119 is controlled in such a manner that the frequency and phase errors are canceled. If the output has no frequency and phase error, the disk 104 is being rotated at a predetermined number of revolutions for each zone. As a result of the above-mentioned operation, the disk 104 is controlled at the CAV (Constant Angular Velocity). Therefore, excessive rotation, interruption and reverse rotation of the disk 104 which take place when no reproduced signal is supplied in a case where focusing or the track servo is deviated can be prevented.

Then, focusing or the track servo is performed so that a state is realized in which the reproduced signal can be read. In this state, an output signal from the magneto-optical head 105 is supplied to the analog signal processing circuit 106 so as to be subjected to a data equalizing process and a binary-coding process. Then, the processed signal is supplied to the pre-pit-region detection circuit 107. As a result, data and a synchronizing signal in the pre-pit region are detected. In the PLL circuit 108, a clock having the phase synchronized with that of data is generated in accordance with the synchronizing signal. The clock having the synchronized phase is used when data in the pre-pit region is read. Read data is transmitted to the outside of the apparatus so as to mainly be used as address information on the disk 104.

Since the synchronizing signals have been recorded on the disk 104 at predetermined data intervals, the pre-pit-region detection circuit 107 measures the intervals of the synchronizing signals with the clock generated by the PLL circuit 108. Thus, also CHECK 132 is performed whether or not the period of time from detection a certain synchronizing signal to detection of a next synchronizing signal is a period of time corresponding to a predetermined number of clocks. If the period of time does not correspond to the predetermined number of clocks, a determination is performed that the synchronizing signal in the pre-pit region has not been reproduced or another determination is performed that the phase of the output clock from the PLL circuit 108 is not been synchronized. Thus, the operation is returned to the spindle control (CAV) which is performed when focusing or the track servo is deviated.

When the reproduced signal does not exist because data is not recorded on the data region, the spindle motor 119 is controlled in accordance with the wobble signal similarly to the conventional structure. Thus, the operation proceeds to WOBBLE AFC 133. When the wobble signal is extracted by the analog signal processing circuit 106, the extracted wobble signal is supplied to the PLL circuit 109. Then, as described in the prior art, clocks having the phase synchronized with that of the wobble signal are supplied from the PLL circuit 109 to the following frequency comparator 111. Moreover, the clocks are used as clocks to transmit data to be recorded when the recording operation is performed. Since the DVD-RAM is structured in such a manner that the frequency of the clocks for reading data is 29.18 MHz when the DVD-RAM disk 104 is rotated at constant linear velocity, the clocks having the above-mentioned frequency are, as reference clocks, supplied to the frequency comparator 111 from a crystal oscillator or the like. The frequency comparator 111 subjects the clocks transmitted from the PLL circuit 109 and the frequency of the reference clock to a comparison so that a frequency error signal is transmitted.

In LOCK 134, the state of the frequency comparator 111 is always checked. When the error signal is not higher than a predetermined value (when the frequency of the output clock from the PLL circuit 109 has approached the above-mentioned frequency of the reference clock), the operation proceeds to WOBBLE APC 135. On the other hand, the frequency divider 113 is supplied with a reference clock having the frequency of 29.18 MHz from the crystal oscillator or the like, similarly to the frequency comparator 111. The reference clock is divided at a division ratio corresponding to the division ratio of the clock and the wobble signal transmitted from the PLL circuit 109 (the frequency of the divide clock is made to be the same as the frequency of the wobble signal in a case where the disk 104 is being rotated at constant linear velocity). Then, the phase comparator 112 subjects the phase of the output signal from the frequency divider 113 and that of the output timing of the wobble signal extracted by the analog signal processing circuit 106 are subjected to a comparison. If the phase of the timing of the wobble signal and that of the output signal from the frequency divider 113 are not synchronized with each other, the amount of the error is measured so as to be transmitted as a phase error signal. Since the phase of the output clocks from the PLL circuit 109 is synchronized with that of the wobble signal, the clocks transmitted from the PLL circuit 109 and divided may be supplied to the phase comparator 112 as clocks corresponding to the wobble signal in place of the wobble signal. Moreover, the phases of the foregoing clocks and that of the output signal from the frequency divider 113 may be subjected to a comparison.

Both of the frequency error signal and the phase error signal are supplied to the calculator 114 so as to be multiplied with a real number and subjected to a gain adjustment. Then, the signals are added to each other so as to be transmitted. The output of the calculator 114 is supplied to the selector 115. If the state in which the disk 104 is not interrupted in STOP 136, focusing or the track servo is performed so that data in the pre-pit region is normally be read. If data is not recorded on the data region, the frequency and the output of the phase error of the calculator 114 are selected by the selector 115 so as to be supplied to the PWM-signal generating circuit 116. The amount of the error is subjected to PWM so as to be removed. The output is supplied to the low pass filter 117 so that high frequency component of the signal is removed.

When the low pass filter 117 is composed of a digital filter, the operation for converting the amount of the error into change in the time axis by performing the PWM is performed by the digital filter. Therefore, the PWM-signal generating circuit 116 is not required.

Then, the output of the low pass filter 117 is supplied to the operation amplifier 118 so that the spindle motor 119 is controlled in such a manner that the frequency and phase errors are canceled. If no frequency and phase error exists, the phase of the reproduced wobble signal is synchronized with that of the reference clock. Therefore, the disk 104 is controlled at the constant linear velocity (CLV).

Since no wobble signal is recorded on the pre-pit region of the disk 104 and thus the wobble signal cannot be obtained because the foregoing region is being reproduced, the reproduced signal is supplied from the analog signal processing circuit 106 by the identification-signal generating circuit 110. Thus, a signal for distinguishing the pre-pit region and the data region from each other is transmitted. At this time, the comparing operations of the frequency comparator 111 and the phase comparator 112 are changed, interrupted or stopped in accordance with the identification signal. In the case of the pre-pit region, the error signal obtained immediately before the output of the pre-pit region identification signal is held and transmitted. When the data-region identification signal is transmitted, the comparing operation is restarted so as to transmit an error signal. Thus, a malfunction can be prevented even if the wobble signal cannot be obtained.

In the pre-pit region, the output clock from the PLL circuit 108 may be supplied to the frequency comparator 111 in place of the output clock from the PLL circuit 109. Moreover, the output clock from the PLL circuit 108 may be divided at the same division ratio as that of the frequency divider 113 so as to be supplied to the phase comparator 112 in place of the wobble signal to cause the phase comparator 112 to continue the comparing operation.

In the pre-pit region, only the frequency comparator 111 may be caused to perform the comparing operation by using the output clock from the PLL circuit 108. On the other hand, the phase comparator 112 may store the output of the error signal as described above. In this case, an influence (the phase of the wobble signal and that of the divided clock of the PLL circuit 108 are not synchronized with each other) exerted due to rapid change in the output of the phase error which is made in their boundaries can be prevented.

In a state in which the spindle motor is being controlled in response to the wobble signal, address information recorded on the pre-pit region is read from the pre-pit-region detection circuit 107. If the address is a predetermined address of a portion on which data is required to be recorded, the signal to be recorded which has been processed by the record signal generating circuit 136 is synchronized with the output clock from the PLL circuit 109 in the data region so as to be read. The read signal to be recorded is allowed to pass through the analog processing circuit 137 so as to be recorded on the DVD-RAM disk 104 through the magneto-optical head 105.

When focusing or the track servo is deviated during the above-mentioned control operation, the recording operation is inhibited because the wobble signal cannot be read in a state where the spindle motor is controlled by the CAV method.

When the DVD-RAM disk 104 is brought to the interruption state in STOP 136, the operation proceeds to BRAKE 137. Thus, a brake signal is supplied to the amplifier 118 through the low pass filter 117. When the DVD-RAM disk 104 has been stopped, the brake signal is suspended in CLV OFF 138 so that the operation proceeds to END 139.

Since the third embodiment of the present invention is operated as described above, the disk 104 is CLV-controlled with clocks having the phase synchronized with that of the wobble signal during a usual recording operation. If the phase of the clocks is not synchronized or if focusing or the track servo is deviated, the CAV control using the pulse generator 120 is performed. Therefore, the spindle motor can appropriately be controlled in accordance with the state of the disk 104. If the wobble signal cannot be read and thus the CLV control is not performed, the recording operation is inhibited. Thus, even if data is recorded at an incorrect position, deletion of data can be prevented. Moreover, excessive rotation, interruption or inverse rotation of the disk 104 can be prevented because of the CAV control. When the wobble signal can be read by the pulse generator 120, the CAV control is performed in such a manner that the phase synchronization of the PLL circuit 109 can easily be performed.

Fourth Embodiment

Figure 7:
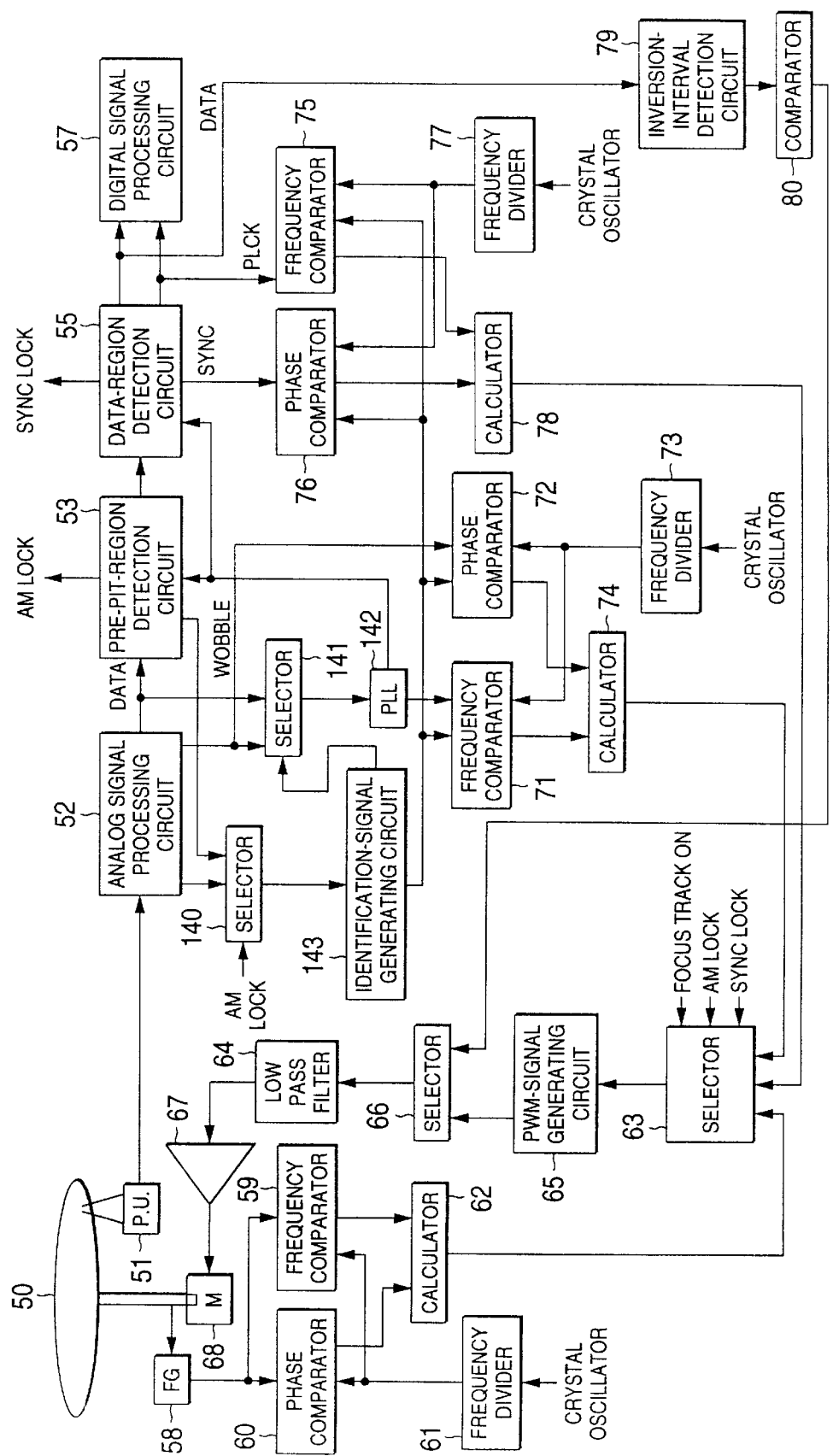
FIG. 7 is a block diagram showing a fourth embodiment of the disk-rotation control apparatus according to the present invention.

FIG. 7 is a block diagram showing a fourth embodiment of the disk-rotation control apparatus according to the present invention. The same reference numerals as those shown in FIG. 3 represent the same or corresponding elements. Referring to FIG. 7, reference numerals 140 and 141 represent selectors, 142 represents a PLL circuit and 143 represents an identification-signal generating circuit for distinguishing the pre-pit region and the data region from each other and transmitting an identification signal.

The operation will now be described. When focusing or the track servo is performed and thus a state in which a reproduced signal can be read is realized, the output signal from the optical pickup 51 is supplied to the analog signal processing circuit 52. Thus, a data equalizing operation and a binary coding operation are performed, and then data is supplied to the pre-pit-region detection circuit 53. Thus, data and the synchronizing signal in the pre-pit region are detected.

When a signal indicating a fact that the pre-pit region is being reproduced is supplied from the analog signal processing circuit 52 to the selector 140, the supplied signal is selected and supplied to the identification-signal generating circuit 143. The output of the identification-signal generating circuit 143 is supplied to the selector 141. The selector 141 establishes the connection with the portion in which the reproduced signal from the analog signal processing circuit 52 is supplied to the PLL circuit 142. In the portions except for the pre-pit region, the wobble signal is selected.

In the PLL circuit 142, clocks having the phase synchronized with that of the reproduced signal are generated in the pre-pit region. In the other portions, clocks having the phase synchronized with that of the wobble signal are generated. The pre-pit-region detection circuit 53 measures the intervals of the synchronizing signals of data in the pre-pit region with the clocks generated by the PLL circuit 142. Then, a determination is made whether or not the period of time from detection of a certain synchronizing signal to detection of a next synchronizing signal is a period corresponding to a predetermined number of clocks. If the period of time does not correspond to the predetermined number of clocks, a determination is made that the synchronizing signal in the pre-pit region is not reproduced or the phase of the output clocks of the PLL circuit 142 is not synchronized. Thus, a detection signal is transmitted.

When the period of time corresponds to the predetermined number of clocks, a determination is made that the phases are synchronized with each other. Thus, a result of the detection is supplied to the selector 140. When the phases are synchronized with each other, determination signals generated in accordance with the synchronizing signal in the pre-pit region with the output clocks from the PLL circuit 142 and indicating the pre-pit region and the data region are selected by the selector 140 so as to be supplied from the pre-pit-region detection circuit 53 to the identification-signal generating circuit 143. Therefore, the PLL circuit 142 is supplied with the determination signals indicating the pre-pit region and the data region. Thus, the PLL circuit 142 is supplied with reproduced signals in the pre-pit region and the data region in accordance with the determination signals after a result of the detection indicating that the phases are synchronized with each other has been transmitted from the pre-pit-region detection circuit 53. Thus, the PLL circuit 142 generates and transmits clocks having the phases synchronized with data in the pre-pit region and the data region so as to be supplied to the pre-pit-region detection circuit 53 and the data-region detection circuit 55. As a result, data is read.

In a period in which the determination signals indicating the pre-pit region and the data region are not transmitted from the identification-signal generating circuit 143, the selector 141 selects the wobble signal. Therefore, the PLL circuit 142 generates clocks having the phase synchronized with that of the wobble signal. Then, the frequency comparator 71 is supplied with the output of the identification-signal generating circuit 143 and that of the PLL circuit 142. The phase comparator 72 is supplied with the output of the identification-signal generating circuit 143 and the wobble signal. The frequency comparator 75 is supplied with the output of the PLL circuit 142. When the synchronization of the phases of the output clocks of the PLL circuit 142 is detected by both pre-pit-region detection circuit 53 and the data-region detection circuit 55, the output of the calculator 78 is selected by the selector 63, as described in the first embodiment. In the data region, the clocks having the phase synchronized with that of data in the data region are used to CLV-control the spindle motor 68. In the pre-pit region, clocks having the phase synchronized with data in the pre-pit region are used to CLV-control the spindle motor 68.

When only the pre-pit-region detection circuit 53 detects the synchronization of the phases, the output of the comparator 80 is selected by the selector 66. In the data region, the CLV control is performed in accordance with the inversion interval of data. In a period in which the determination signals indicating the pre-pit region and the data region are not transmitted from the identification-signal generating circuit 143, the output of the calculator 74 is selected by the selector 63. Therefore, the CLV control is performed with the clocks having the phase synchronized with that of the wobble signal. If the synchronization of the phases is not detected by the pre-pit-region detection circuit 53, the CAV control on the basis of the pulse generator 58 is performed.

Since the fourth embodiment of the present invention is operated as described above, only one PLL circuit is able to generate phase synchronizing clocks with respect to the reproduced signals in the pre-pit region, the data region and the other regions. Thus, the spindle motor 68 can appropriately be controlled to be adaptable to the state of the PLL circuit 142 in each region.

Fifth Embodiment

Figure 8:
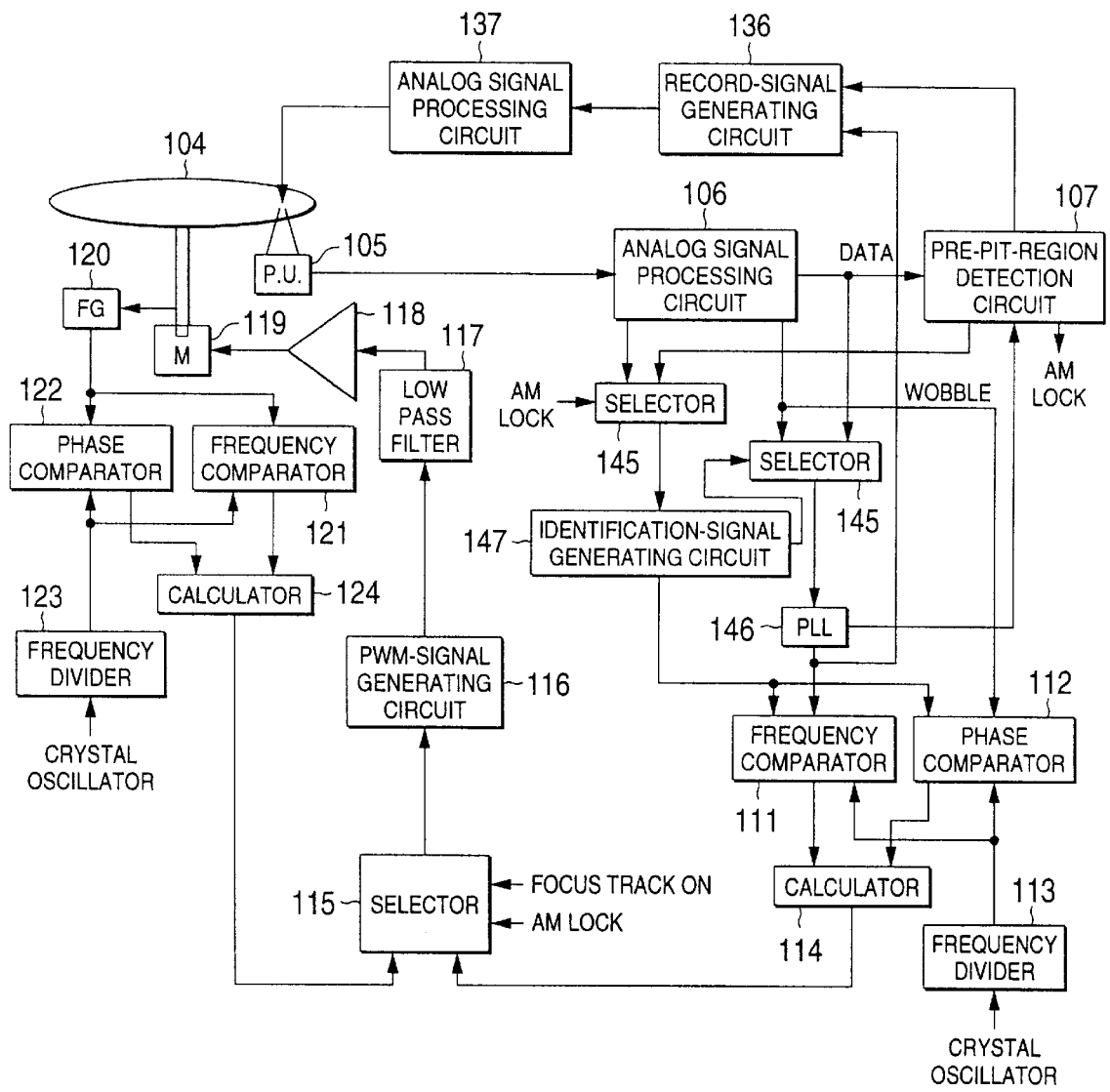
FIG. 8 is a block diagram showing a fifth embodiment of the disk-rotation control apparatus according to the present invention.

FIG. 8 is a block diagram showing a fourth embodiment of the disk-rotation control apparatus according to the present invention. The same reference numerals as those shown in FIG. 5 represent the same or corresponding elements. Referring to FIG. 8, reference numerals 144 and 145 represent selectors, 146 represents a PLL circuit and 147 represents an identification-signal generating circuit for determining the pre-pit region and the data region and transmitting identification signals.

The operation will now be described. When focusing or the track servo is performed and a state in which the reproduced signal can be read is realized, an output signal from the magneto-optical head 105 is supplied to the analog signal processing circuit 106 so as to be subjected to data equalizing and binary coding. The processed data is supplied to the pre-pit-region detection circuit 107 so that data and a synchronizing signal in the pre-pit region are detected.

When a signal indicating that the pre-pit region is being reproduced is supplied from the analog signal processing circuit 106 to the selector 144, the foregoing signal is selected so as to be supplied to the identification-signal generating circuit 147. The output of the identification-signal generating circuit 147 is supplied to the selector 145. The selector 145 establishes the connection in such a manner that the reproduced signal from the analog signal processing circuit 106 is supplied to the PLL circuit 146 if the region is the pre-pit region. In the regions except for the pre-pit region, the wobble signal is selected.

The PLL circuit 146 generates clocks having the phase synchronized with that of the reproduced signal in the pre-pit region. In the regions except for the pre-pit region, clocks having the phase synchronized with that of the wobble signal are generated. The pre-pit-region detection circuit 107 measures the intervals of the synchronizing signals of data with the clocks generated by the PLL circuit 146. Then, a determination is made whether or not a period of time from detection of a certain synchronizing signal to detection of a next synchronizing signal is a period of time corresponding to a predetermined number of clocks. If the period of time does not correspond to the predetermined number of clocks, a determination is made that the synchronizing signal in the pre-pit region is not being reproduced or the phase of the output clocks from the PLL circuit 146 is not synchronized. Thus, a detection signal is transmitted.

When the period of time corresponds to the predetermined number of clocks, a result of detection indicating that the phases are synchronized with each other is supplied to the selector 144. If the phases are synchronized with each other, a determination signal generated in accordance with the synchronizing signal in the pre-pit region and indicating the pre-pit region is selected by the selector 144 with the output clocks from the PLL circuit 146 and supplied from the pre-pit-region detection circuit 107 to the identification-signal generating circuit 147 as a result of selection performed by the selector 144. Therefore, the signal indicating a fact that the pre-pit region is being reproduced is not supplied from the analog signal processing circuit 106 to the PLL circuit 146. As an alternative to this, the determination signal generated in accordance with the synchronizing signal in the pre-pit region and indicating the pre-pit region is supplied from the pre-pit-region detection circuit 107 to the PLL circuit 146. Thus, a furthermore accurate signal synchronized with the reproduced signal is supplied. After the result of detection indicating the phases are synchronized with each other has been transmitted from the pre-pit-region detection circuit 107, the PLL circuit 146 is accurately supplied with the reproduced signal in the pre-pit region in accordance with the determination signal. Thus, clocks having the phase synchronized with that of data in the pre-pit region are generated and transmitted so as to be supplied to the pre-pit-region detection circuit 107. As a result, all of data items can be read. When a data recording operation is performed, the selector 145 selects the wobble signal in a period in which the determination signal indicating the pre-pit region is not transmitted from the identification-signal generating circuit 143. Therefore, the PLL circuit 146 generates clocks having the phase synchronized with that of the wobble signal.

On the other hand, the determination signal is also supplied to a circuit 136 for processing a signal to be recorded. If the address is a predetermined address as a result of reading of data in the pre-pit region, also a signal indicating the data region is generated from the determination signal. Thus, data to be recorded is read from the circuit 136 for processing a signal to be recorded. Data to be recorded is read with the clocks having the phase synchronized with that of the wobble signal. When the pre-pit-region detection circuit 107 detects a detection signal indicating that the phases are not synchronized with each other, data to be recorded is not read and thus the recording operation is interrupted.

Then, the frequency comparator 111 is supplied with the output of the identification-signal generating circuit 147 and that of the PLL circuit 146. The phase comparator 112 is supplied with the output of the PLL circuit 146 and the wobble signal. As described in the second embodiment, when the phase synchronization of clocks transmitted from the PLL circuit 146 is detected by the pre-pit-region detection circuit 107, the output of the calculator 114 is selected by the selector 63. Thus, the spindle motor 119 is CLV-controlled with the clocks having the phase synchronized with that of the wobble signal. If the phase synchronization is not detected by the pre-pit-region detection circuit 107, the CAV control on the basis of the pulse generator 120 is performed.

Since the fifth embodiment is operated as described above, one PLL circuit is able to generate phase-synchronized clocks in such a manner that clocks having the phase synchronized with that of data in the pre-pit region and clocks having the phase synchronized with that of the wobble signal are generated. Therefore, the pulse generator 120 can appropriately be controlled to be suitable to the state of the PLL circuit 146 in each region.

Sixth Embodiment

Figure 9:
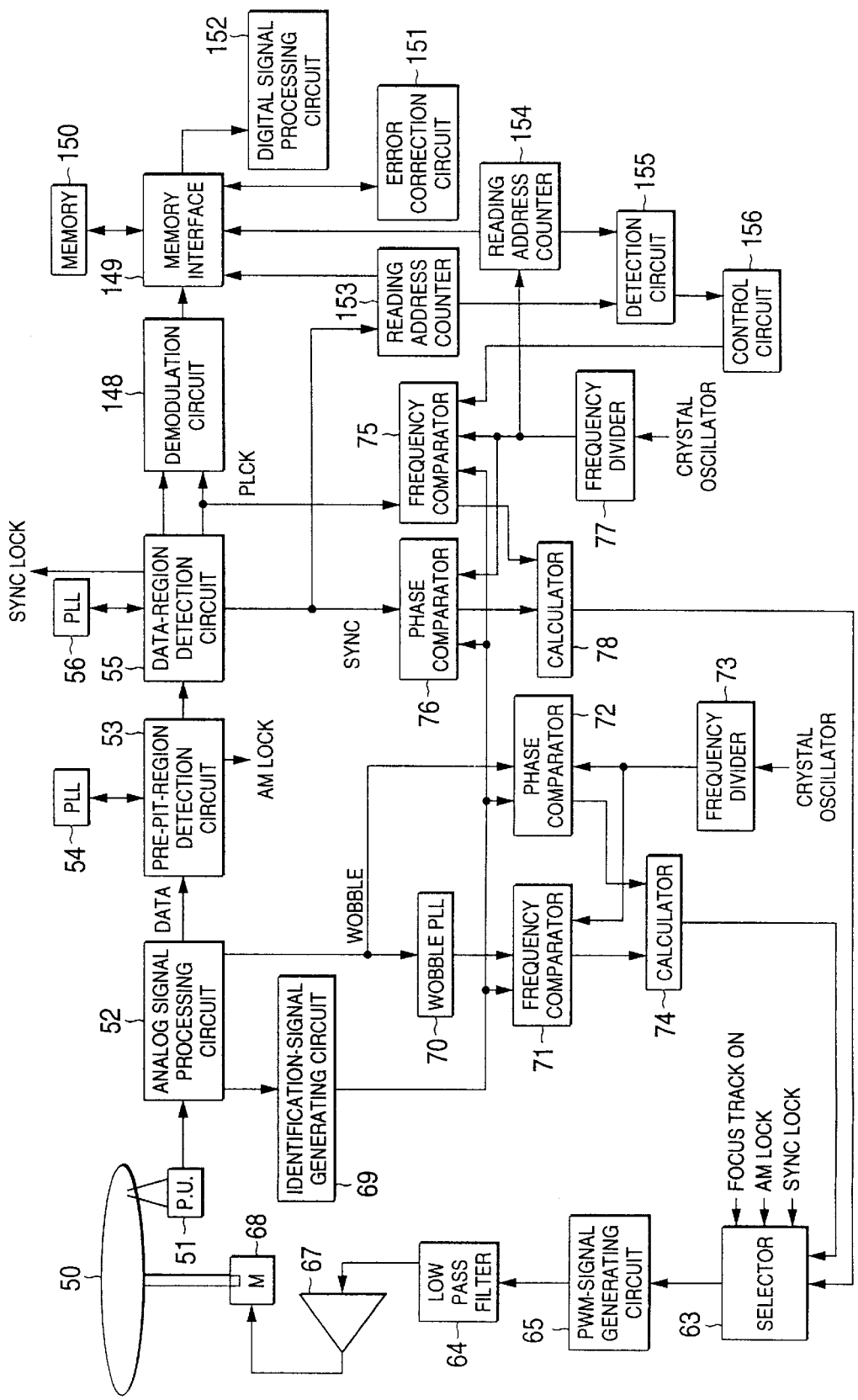
FIG. 9 is a block diagram showing a sixth embodiment of the disk-rotation control apparatus according to the present invention.

FIG. 9 is a block diagram showing a sixth embodiment of the disk-rotation control apparatus according to the present invention. The same reference numerals as those shown in FIG. 3 represent the same or corresponding elements. Referring to FIG. 9, reference numeral 148 represents a demodulation circuit, 149 represents a memory interface, 150 represents a memory, 151 represents an error correction circuit and 152 represents a digital signal processing circuit for processing data read from the memory 150. Reference numeral 153 represents a memory-writing address counter and 154 represents a memory-reading address counter. Reference numeral 155 represents a detection circuit for detecting the difference between the count of the memory-writing address counter 153 and that of the memory-reading address counter 154. Reference numeral 156 represents a control circuit for controlling the operation of the frequency comparator 75 if a difference in the count is detected by the detection circuit 156.

The operation will now be described. Data read from the data-region detection circuit 55 with the clocks transmitted from the PLL circuit 56 is supplied to the demodulation circuit 148 so as to be subjected to a demodulation process (demodulated from 16 bits to 8 bits in the case of a DVD). Then, data is written on the memory 150 through the memory interface 149. The writing address for use at this time is supplied from the memory-writing address counter 153 to the memory 150. The memory-writing address counter 153 is updated with a synchronizing clock (or a clock obtained by dividing the frequency of the synchronizing clock or clock obtained by dividing the output control from the PLL circuit 56 and having the phase synchronized with that of the synchronizing control may be employed) transmitted from the data-region detection circuit 55 in predetermined units of data.

Data written on the memory 150 is subjected to error detection and correction processes in the error correction circuit 151 so that correction of data is performed. Corrected data is read from the memory 150 with the clocks generated by a crystal oscillator or the like so as to be supplied to the following digital signal processing circuit 152 so as to be processed. At this time, the reading address is supplied from the memory-reading address counter 154 to the memory. The memory-reading address counter 154 is updated with a reference clock (or a clock obtained by dividing the frequency of the reference clock or a clock obtained by dividing the clock generated by a crystal oscillator or the like and having the phase synchronized with the phase of the reference clock may be employed) transmitted by the frequency divider 77 in a predetermined units of data.

In the above-mentioned operation, the count of the memory-writing address counter 153 and that of the memory-reading address counter 154 are supplied to the detection circuit 155. The count clock of the memory-writing address counter 153 is made to be a synchronizing clock, while the count clock of the reading counter is made to be a reference clock. Moreover, update is performed with the two edges of the clocks. In this case, the difference between the counts in the detection circuit 155 is always constant if the phases of the synchronizing clock and the reference clock are synchronized with each other in the phase comparator 76. Thus, control is performed in such a manner that superimposition of the reading address and the writing address on the memory 150 is prevented.

Figure 10:
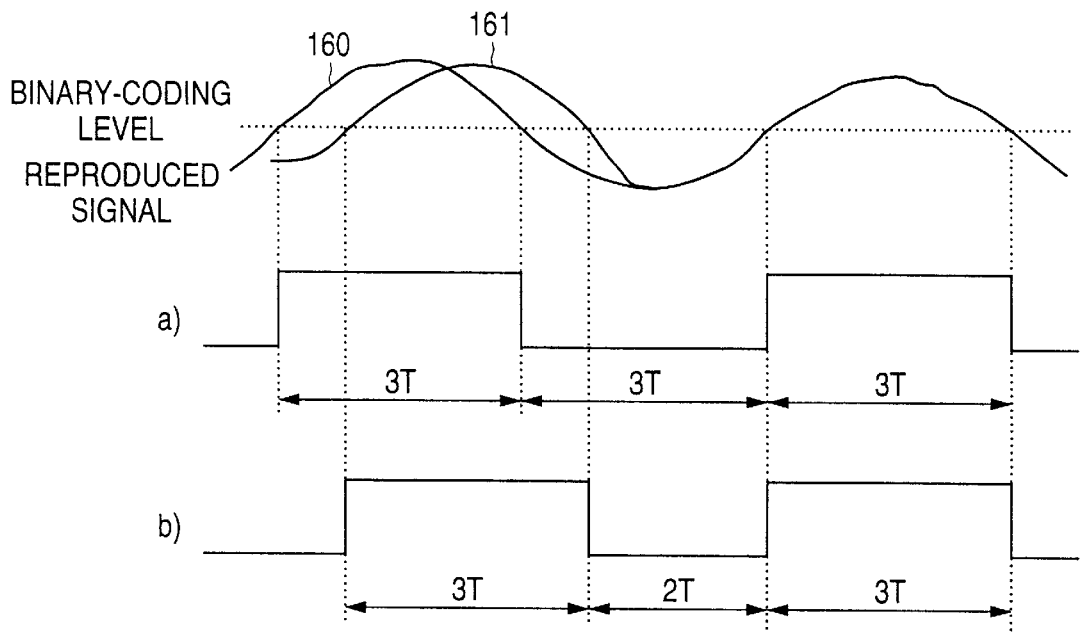
FIG. 10 is a diagram showing a phenomenon occurring when a reproduced signal is binary-coded.

When phase synchronization of the output clocks from the PLL circuits 54 and 56 is detected in both pre-pit-region detection circuit 53 and the data-region detection circuit 55 and the output of the calculator 78 is selected and the spindle motor 68 is CLV-controlled, a phenomenon shown in FIG. 10 sometimes occurs. The reason for this is that the waveform is changed and/or an error is made when the binary coding operation is performed in the analog signal processing circuit 52 depending on the state of reproduction of the disk 50 and change in the rotations of the spindle motor 68. When a reproduced signal 160 is obtained in the case shown in FIG. 10, binary coding is performed so that a waveform (a) shown in FIG. 10 is obtained. In a case of a reproduced signal 161, a waveform (b) shown in FIG. 10 is obtained. In this case, a region 2T is undesirably generated. In a case shown (b) in FIG. 10, the phase of the PLL circuit 56 is synchronized. When the period of the PLL circuit 56 is T, data is read as 2T in the data-region detection circuit 55. Thus, a data error is made.

Figure 11:
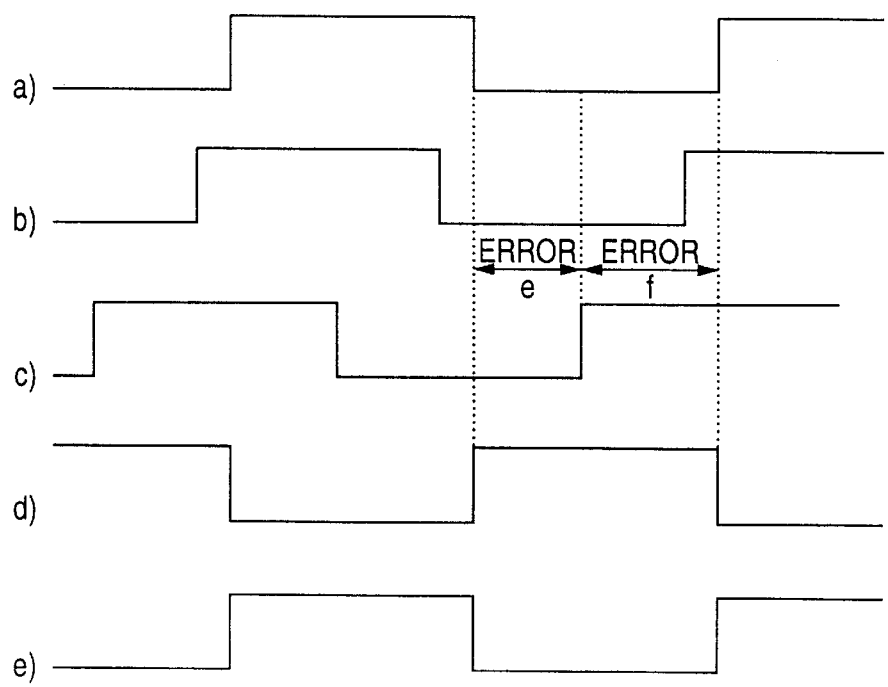
FIG. 11 is a graph showing the operation of a phase comparator according to the sixth embodiment.

In a case (b) shown in FIG. 10, the interval from a synchronizing signal to a next synchronizing signal is shortened from 3T to 2T in the data-region detection circuit 55. Therefore, an error is made in the frequency comparator 75 and the phase comparator 76. Usually, a slight error of about 1T is cut by the low pass filter 64 so that an influence on the spindle motor 68 is prevented. Even if the low pass filter 64 is not used, the error is disregarded because the control band of the spindle motor 68 is not considerably high. However, if a phenomenon as shown (b) in FIG. 10 frequently occurs and errors are accumulated, the phase comparator 76 encounters a phenomenon shown in FIG. 11.

When the reference clock of the frequency divider 77 is made to be as the case shown in FIG. 11(a), the synchronized clock which is transmitted from the data-region detection circuit 55 is usually as shown in FIG. 11(b) in a case where the amount of errors is small. If the amount is somewhat enlarged, a state shown in FIG. 11(c) is realized. If a phase error of ½ clock with respect to the reference clock a is made, error e viewed from the rising edge of signal a and error f viewed from the falling edge of signal b are made to be the same. In this state, signal c is subjected to phase correction in both rising direction of the signal a and the falling direction of the same. If worst comes to worst, a difference in the count in a quantity of "a constant value+1", count is generated in the detection circuit 155 in a case in which the phase synchronization is performed in the state shown in FIG. 11(d)

If phase synchronization is temporarily performed in the state shown in FIG. 11(d), the error signal of the phase comparator 76 is deleted. Even if an error is made, the spindle motor 68 is controlled in such a manner that the error is corrected. Therefore, the state shown in FIG. 11(d) is continuously maintained. Thus, the difference in the count of the detection circuit 155 is continuously made to be a count which is "a constant value+1". Then, a state shown in FIG. 10(b) is again realized. Thus, the state shown in FIG. 11(a) is not realized with respect to the state shown in FIG. 11(d). If phase synchronization as shown in FIG. 11(e) is performed, the difference in the count of the detection circuit 155 is furthermore enlarged. Thus, the count value is made to be a count "a constant value+2". Then, the difference in the count value is enlarged similarly. If the amount exceeds an amount permitted for the memory 150, the value of the memory-writing address counter 153 and that of the memory-reading address counter 154 are made to be the same if worst comes to worst. As a result, data which is being read is deleted with data to be written.

Therefore, the control circuit 156 causes a signal to be transmitted with which a predetermined value is added to or subtracted from a compared error signal of the frequency comparator 75 if the difference in the count value is made to be larger than a predetermined value in the detection circuit 155. Thus, the voltage which is applied to the amplifier 67 through the PWM-signal generating circuit 65 is changed. If the difference in the count value of the memory-writing address counter 153 is reduced with respect to that of the memory-reading address counter 154, the frequency comparator 75 adds a predetermined value to the compared error signal (in a case in which the output clocks from the PLL circuit 56 are measured in each period of the output clock of the frequency divider 77 to generate the compared error signal, addition to the measured number of clocks is performed. In this case, a state in which the disk 50 is rotated at higher speed is realized by the addition). Thus, control of the amplifier 67 is performed in such a manner that the spindle motor 68 is decelerated. Therefore, the disk 50 is decelerated so that the counting speed of the memory-writing address counter 153 which is counted with the synchronizing clock detected from the reproduced signal is made to be lower than the counting speed of the memory-reading address counter 154. Thus, control is performed in such a manner that the difference in the count of the detection circuit 155 is enlarged.

When the difference in the count value of the memory-writing address counter 153 with respect to that of the memory-reading address counter 154 has been enlarged, the control circuit 156 performs control in such a manner that the frequency comparator 75 subtracts a predetermined value from the compared error signal (in a case where the output clocks from the PLL circuit 56 are measured at each output clock from the frequency divider 77 to generate the compared error signal, subtraction from the measured number of clocks is performed. In this case, a state in which the disk 50 is rotated at lower speed is realized as a result of the subtraction). Moreover, the amplifier 67 is controlled in such a manner as to accelerate the spindle motor 68. Therefore, the disk 50 is accelerated. Thus, the counting speed of the memory-writing address counter 153 which is counted with the synchronizing clocks detected from the reproduced signal is made to be higher than the counting speed of the memory-reading address counter 154. As a result, control is performed in such a manner that the difference in the count value of the detection circuit 155 is reduced.

The above-mentioned control operation is an example of the operation of the control circuit 156. When change in the count value of the memory-writing address counter 153 with respect to that of the memory-reading address counter 154 is detected by the detection circuit 155, the control circuit 156 usually performs control in such a manner that a predetermined value is added to or subtracted from the compared error signal as a result of the structure of the frequency comparator 75. Thus, the number of revolutions of the spindle motor 68 is changed so that the difference in the count value is always a constant value.

As a result of the above-mentioned operation, the difference of the count value between the memory-writing address counter 153 and the memory-reading address counter 154 is enlarged. Thus, the value of the memory-writing address counter 153 and that of the memory-reading address counter 154 are made to be the same. As a result, deletion of data, which is being read, with data to be written can be prevented.

Seventh Embodiment

Figure 12:
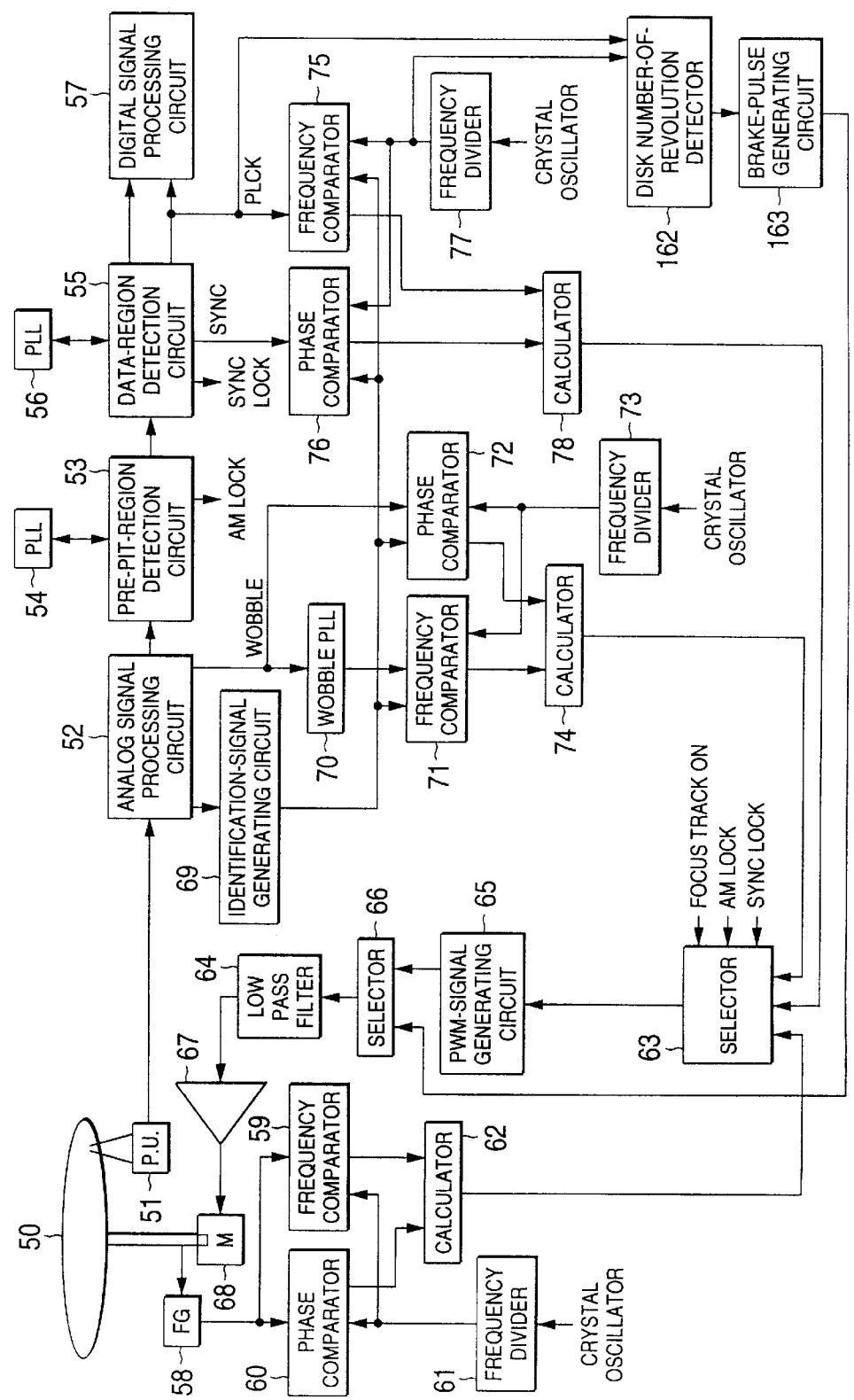
FIG. 12 is a block diagram showing a seventh embodiment of the disk-rotation control apparatus according to the present invention.

FIG. 12 is a block diagram showing a seventh embodiment of the disk-rotation control apparatus according to the present invention. The same reference numerals as those shown in FIG. 3 represent the same or corresponding elements. Referring to FIG. 12, reference numeral 162 represents a detector 162 for detecting the number of revolutions of the spindle motor 68. Reference numeral 163 represents a brake pulse generating circuit for generating brake pulses in accordance with a result of detection performed by the detector 162.

The operation will now be described. Referring to FIG. 12, the intervals of the reproduced signals detected by the data-region detection circuit 55 are measured with the clocks generated by the PLL circuit 56. If a period of time from detection of a certain synchronizing signal to detection of a next synchronizing signal is a period of time corresponding to a predetermined number of clocks, that is, if a usual reproduction state is realized, the operation proceeds to BRAKE 101 shown in FIG. 4 so that rotations of the disk 50 is interrupted by the following operation.

In BRAKE 101, the reference clock divided by the frequency divider 77 is supplied to the detector 162. Also the clock generated by the PLL circuit 56 is supplied to the detector 162. Then, similarly to the frequency comparator 75, the number of clocks generated by the PLL circuit 56 is measured at each predetermined period of the reference clocks. When the number of the generated clocks is made to be a value not larger than a predetermined value (although a constant value is obtained when rotations are performed at constant linear velocity, the number of generated clocks is reduced if the rotational speed is lowered), for example, $\frac{2}{3}$ rotation or lower, a detection signal is transmitted to the brake pulse generating circuit 163. The predetermined value for the detector 162 to transmit the detection signal is a value which is selected from a range in which the phase synchronization of the PLL circuit 56 can be performed and which is a value realized when rotations are performed at a number of revolutions smaller than that when rotations are performed at usual constant linear velocity.

On the other hand, the brake pulse generating circuit 163 measures time from start of BRAKE 101 to transmission of the detection signal from the detector 162. In BRAKE 101, the brake pulse generating circuit 163 transmits a brake pulse. The selector 63 selects the brake pulse to supply the brake pulse to the spindle motor 68 through the low pass filter 64 and the operation amplifier 67. Therefore, the rotations of the disk 50 are decelerated. The brake pulse generating circuit 163 transmits the brake pulses for a period of time (a period of time taken from the measured time and estimated that the disk 50 will be interrupted) obtained by adding a predetermined period of time to the measured period of time. Then, the transmission is interrupted. Therefore,.the disk 50 does not rotate inversely and stop.

Figure 13:
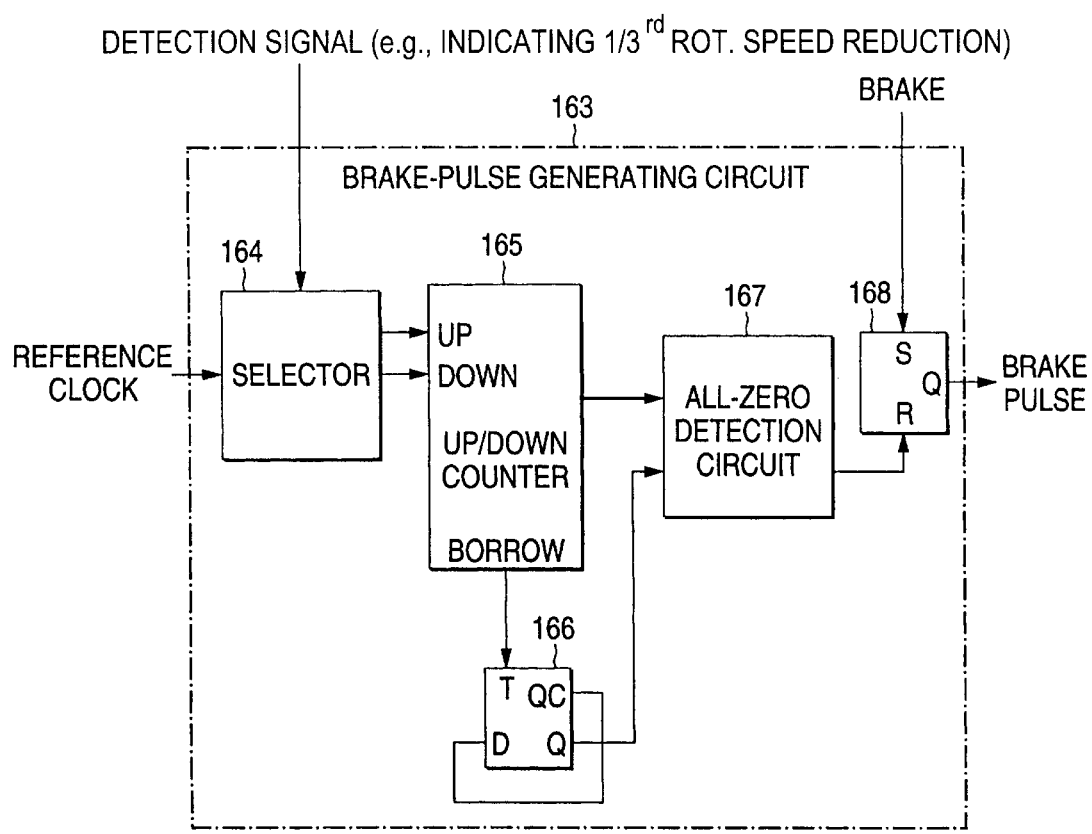
FIG. 13 is a block diagram showing a brake pulse generating circuit according to the seventh embodiment.

FIG. 13 shows an example of the brake pulse generating circuit 163. Referring to FIG. 13, reference numeral 164 represents a selector, 165 represents an up-down counter, 166 represents a flip-flop, 167 represents an all-zero detection circuit and 168 represents a flip-flop.

The operation will now be described. The measurement of time is performed by using the reference clock of the frequency divider 77 or a reference signal. In BRAKE 101, the flip-flop 168 is set so that brake pulses are transmitted. The low pass filter 16 is reset. When the flip-flop 166 is set, the reference clock or the reference signal is, by the selector 164, supplied to the up-count side of the up-down counter 165. Then, counting is performed until a detection signal is supplied from the detector 162. The detector 162 is arranged to transmit the detection signal when the rotation of the disk 50 is made to be $\frac{2}{3}$ rotation as described above.

When the detection signal is supplied, the selector 164 switches the reference clock or the reference signal to the down-counter side of the up-down counter 165. At this time, borrow output (when the decrease in the count causes the count to exceed a reset value of zero, borrow takes place) is transmitted because the decrease in the count value. Then, a clock is supplied to the following flip-flop 166. The output is made to be zero (brought to a reset state). Then, the count of the up-down counter 165 is continuously decreased. When the count value is made to be the reset value of zero, the all-zero detection circuit 167 resets the flip-flop 168 because the count of the previous flip-flop 166 is zero. Therefore, the output of the brake pulse is canceled at this time.

As a result, the flip-flop 166 of the above-mentioned structure is operated in such a manner that the decreased count of the low pass filter 16 is enlarged in a quantity corresponding to one bit, that is, two times. Therefore, the reset signal is transmitted from the all-zero detection circuit 167 when the count has been decreased for a period of time which is two times the period of time in which the count of the up-down counter 165 is increased. Assuming that the time for which the count is increased is time at which the rotation of the disk is made to be $\frac{2}{3}$, the rotation of the disk 50 is interrupted when the reset signal is transmitted from the all-zero detection circuit 167. Thus, the brake pulse is canceled and inverse rotation is prevented.

Eighth Embodiment

Figure 14:
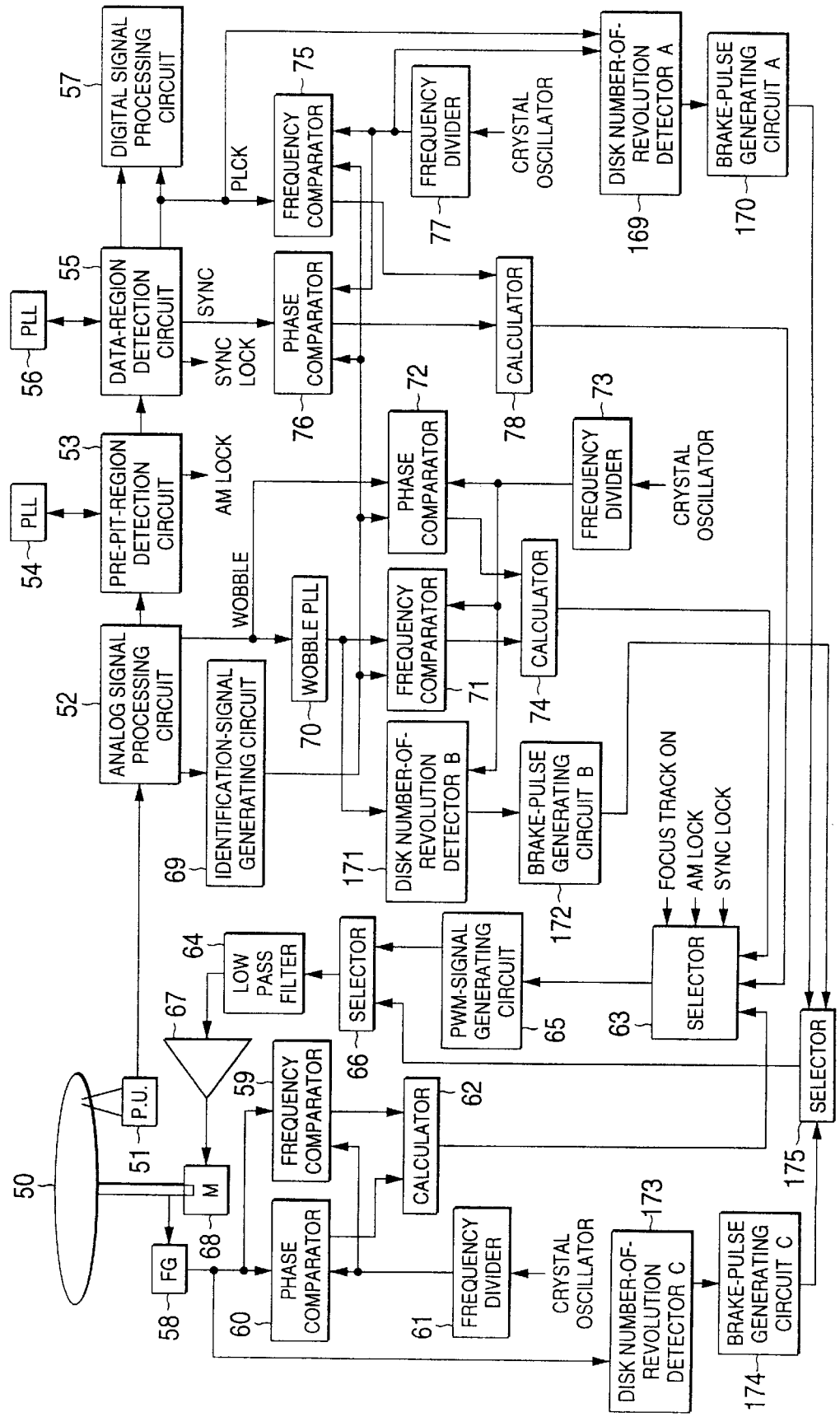
FIG. 14 is a block diagram of showing an eighth embodiment of the disk-rotation control apparatus according to the present invention.
Figure 15:
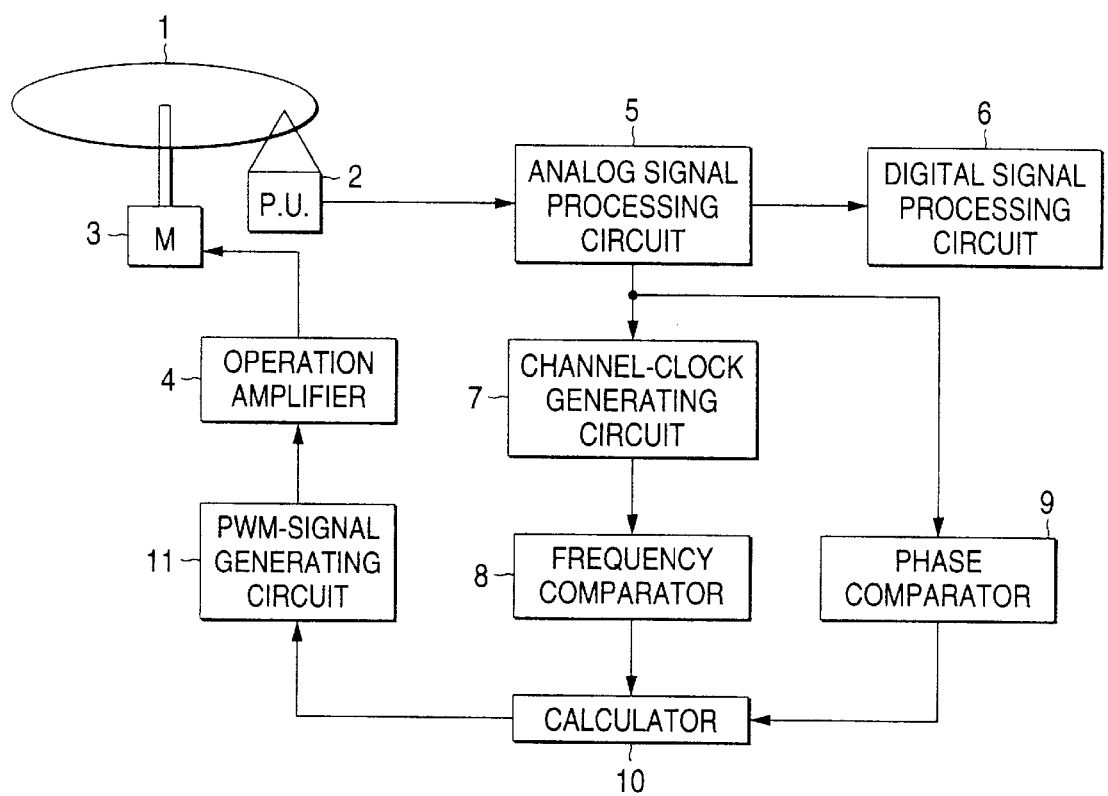
FIG. 15 is a block diagram showing a conventional disk-rotation control apparatus.
Figure 16:
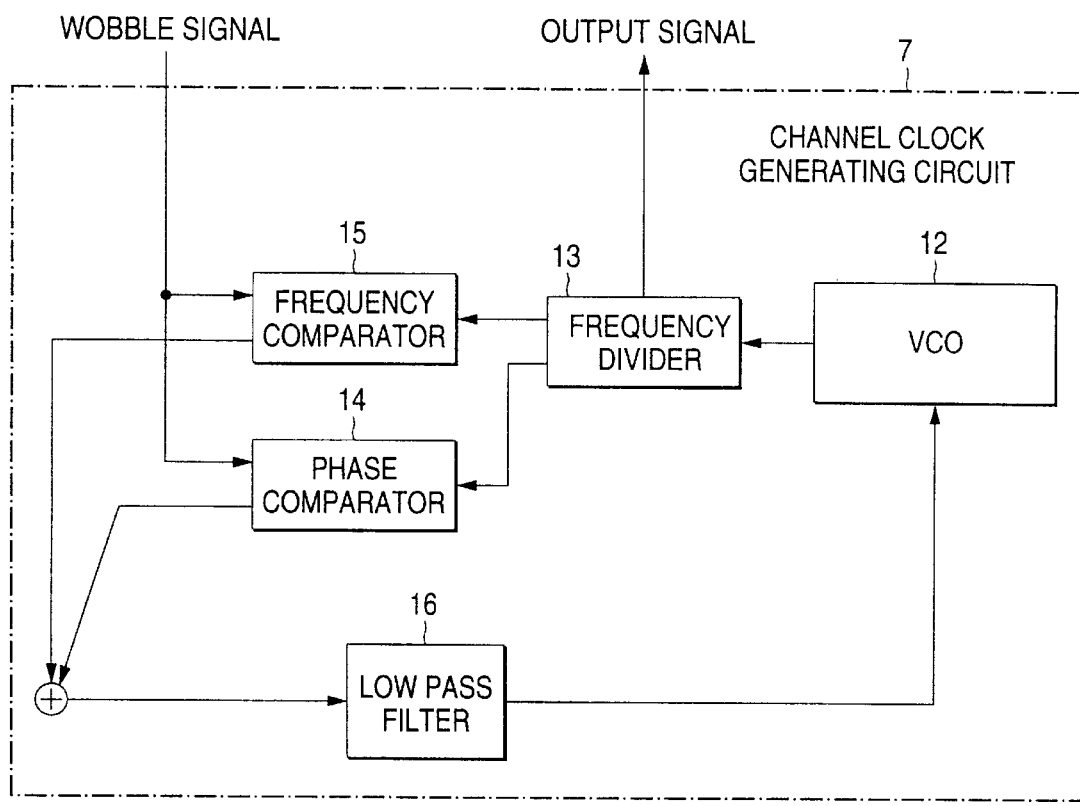
FIG. 16 is a block diagram showing a PLL circuit of the conventional apparatus.

FIG. 14 is a block diagram showing an eighth embodiment of the disk-rotation control apparatus according to the present invention. The same reference numerals as those shown in FIG. 3 represent the same or corresponding elements. Referring to FIG. 14, reference numeral 169 represents a disk number-of-revolution detector A for detecting the number of revolutions of the spindle motor 68. Reference numeral 170 represents a brake-pulse generating circuit A for generating brake pulses in accordance with a result of the detection performed by the disk number-of-revolution detector A169. Reference numeral 171 represents a disk number-of-revolution detector B for detecting the number of revolutions of the spindle motor 68. Reference numeral 172 represents a brake-pulse generating circuit B for generating brake pulses in accordance with a result of the detection performed by the disk number-of-revolution detector B171. Reference numeral 173 represents a disk number-of-revolution detector C for detecting the number of revolutions of the spindle motor 68. Reference numeral 174 represents a brake-pulse generating circuit C for generating brake pulses in accordance with a result of detection performed by the disk number-of-revolution detector C. Reference numeral 175 represents a selector.

The operation will now be described. In the structure shown in FIG. 14, the intervals of synchronizing signals detected by the data-region detection circuit 55 are measured with the clocks generated by the PLL circuit 56. When a period of time from detection of a synchronizing signal to detection of a next synchronizing signal is a period of time corresponding to a predetermined number of clocks, that is, when the state is a usual reproducing state, the operation proceeds to BRAKE 101 shown in FIG. 4 so that the rotation of the disk 50 is interrupted by the following operation.

In BRAKE 101, the reference clock divided by the frequency divider 77 is supplied to the disk number-of-revolution detector A169. Also the clock generated by the PLL circuit 56 is supplied to the disk number-of-revolution detector A169. Similarly to the frequency comparator 75, the number of clocks generated by the PLL circuit 56 is counted at each of the predetermined periods of the reference clocks. When the number of the generated clocks is made to be a value not larger than a predetermined value (although a constant value is obtained when rotations are performed at constant linear velocity, the number of generated clocks is reduced if the rotational speed is lowered), for example, $\frac{2}{3}$ rotation or lower, a detection signal is transmitted to the brake pulse generating circuit A170. The predetermined value for the detector A169 to transmit the detection signal is a value which is selected from a range in which the phase synchronization of the PLL circuit 56 can be performed and which is a value realized when rotations are performed at a number of revolutions smaller than that when rotations are performed at usual constant linear velocity.

On the other hand, the brake pulse generating circuit A170 measures time from start of BRAKE 101 to transmission of the detection signal from the detector A169. In BRAKE 101, the brake pulse generating circuit A170 transmits a brake pulse. The selector 175 and the selector 66 select the brake pulse to supply the brake pulse to the spindle motor 68 through the low pass filter 64 and the amplifier 67. Therefore, the rotations of the disk 50 is decelerated. The brake pulse generating circuit A170 transmits the brake pulses for a period of time (a period of time taken from the measured time and estimated that the disk 50 will be interrupted) obtained by adding a predetermined period of time to the measured period of time. Then, the transmission is interrupted. Therefore, the disk 50 does not rotate inversely and stop.

As a result of the above-mentioned process, the intervals of the synchronizing signals are measured with the clocks generated by the PLL circuit 56. Then, CHECK 89 is performed whether or not the period of time from detection of a certain synchronizing signal to detection of a next synchronizing signal is a period of time corresponding to a predetermined number of clocks. If the period of time does not correspond to the predetermined number of clocks and if data is not recorded in the data region or the phase synchronization of the output clock from the PLL circuit 56 is not established, the following operation is performed.

The spindle motor 68 is controlled in accordance with the wobble signal, and then the operation proceeds to WOBBLE AFC 97 shown in FIG. 4. In BRAKE 101, the reference clock divided by the frequency divider 73 is supplied to the disk number-of-revolution detector B171. On the other hand, the clock generated by the PLL circuit 70 is supplied. Then, similarly to the frequency comparator 71, the number of clocks generated by the PLL circuit 70 is measured at each predetermined period of the reference clocks. When the number of the generated clocks is made to be a value not larger than a predetermined value (although a constant value is obtained when rotations are performed at constant linear velocity, the number of generated clocks is reduced if the rotational speed is lowered), for example, ⅔ rotation or lower, a detection signal is transmitted to the brake pulse generating circuit B172. The predetermined value for the detector B171 to transmit the detection signal is a value which is selected from a range in which the phase synchronization of the PLL circuit 70 can be performed and which is a value realized when rotations are performed at a number of revolutions smaller than that when rotations are performed at usual constant linear velocity.

On the other hand, the brake pulse generating circuit B172 measures time from start of BRAKE 101 to transmission of the detection signal from the detector B171. In BRAKE 101, the brake pulse generating circuit B172 transmits a brake pulse. The selector 175 and the selector 66 select the foregoing brake pulse to supply the brake pulse to the spindle motor 68 through the low pass filter 64 and the amplifier 67. Therefore, the rotations of the disk 50 is decelerated. The brake pulse generating circuit B172 transmits the brake pulses for a period of time (a period of time taken from the measured time and estimated that the disk 50 will be interrupted) obtained by adding a predetermined period of time to the measured period of time. Then, the transmission is interrupted. Therefore, the disk 50 does not rotate inversely and stop.

If the wobble signal cannot normally be read because of deviation of focusing or the track servo, the spindle control using the pulse generator 58 is performed. When the operation proceeds to BRAKE 101 from FGAFC 85 or FGAFC 87 shown in FIG. 4, the following operation is performed. Initially, the reference clock divided by the frequency divider 61 is supplied to the disk number-of-revolution detector C173. Moreover, the pulse generated by the pulse generator 58 is supplied. Then, similarly to the frequency comparator 59, the number of clocks generated by the pulse generator 58 is measured at each predetermined period of the reference clocks. When the number of the generated clocks is made to be a value not larger than a predetermined value (although a constant value is obtained when rotations are performed at constant linear velocity, the number of generated clocks is reduced if the rotational speed is lowered), for example, ⅔ rotation or lower, a detection signal is transmitted to the brake pulse generating circuit C174. The predetermined value for the detector C173 to transmit the detection signal is a value which is realized when rotations are performed at a number of revolutions smaller than that when rotations are performed at usual constant angular velocity.

The brake pulse generating circuit C174 measures time from start of BRAKE 101 to transmission of the detection signal from the detector C173. In BRAKE 101, the brake pulse generating circuit C174 transmits a brake pulse. The selector 175 and the selector 66 select the foregoing brake pulse to supply the brake pulse to the spindle motor 68 through the low pass filter 64 and the amplifier 67. Therefore, the rotations of the disk 50 is decelerated. The brake pulse generating circuit C174 transmits the brake pulses for a period of time (a period of time taken from the measured time and estimated that the disk 50 will be interrupted) obtained by adding a predetermined period of time to the measured period of time. Then, the transmission is interrupted. Therefore, the disk 50 does not rotate inversely and stop.

The above-mentioned control may be structured in such a manner that all of the detectors A169, B171 and C173 are operated in BRAKE 101 in a usual reproducing state. Moreover, the brake pulses are transmitted from the brake-pulse generating circuits A170, B172 and C174. At this time, the selector 175 selects the output of the brake-pulse generating circuit A170. If the phase synchronization of the PLL circuit 56 is deviated during the brake operation and the number of revolutions of the disk cannot accurately be determined because of the phase deviation even after the detector A169 has measured the number of generated clocks, switching to the output of the brake-pulse generating circuit B172 is performed when the phase has been deviated. Therefore, malfunction can be prevented.

If focusing or the track servo is deviated during the braking operation, switching the output of the brake-pulse generating circuit C174 is performed.

Since the above-mentioned structure is arranged in such a manner that the selector 175 selects any one of the outputs of the brake-pulse generating circuits A170, B172 and C174 in accordance with a state of reproduction, the disk can accurately be stopped.

Since-the present invention is structured as described above, the following effects can be obtained.

According to one aspect of the present invention, when the synchronizing signals reproduced from the disk are detected at predetermined intervals, the rotations of the disk are controlled with the clocks synchronized with the reproduced signals. If the synchronizing signals are not detected at predetermined intervals and thus clocks synchronized with the reproduced signals cannot normally be obtained, the rotations of the disk are controlled with the signal detected by the guide detection means. Even if the guide detection means cannot normally detect the signal, the rotations of the disk are controlled by the pulse generator. Therefore, even if information about the rotations of the disk cannot normally be obtained from the reproduced signal from the disk, the rotations of the disk can be controlled. Thus, effects can be obtained in that excessive rotation, stop and inverse rotation of the disk can be prevented. Moreover, the rotations of the disk can always be controlled to be suitable to the state of reproduction of the disk.

According to another aspect of the present invention, when determination is made that the synchronizing signals are not detected at predetermined intervals, the longest or shortest inversion interval of the reproduced signal or the longest or shortest period of the same is detected. In accordance with a result of the detection, the rotations of the disk are controlled. Therefore, an effect can be obtained in that precise control can be performed in a state in which the state of reproduction of data is reflected on the control.

According to another aspect of the present invention, a signal synchronized with the guide detection signal is used in a a usual recording operation to control the rotations of the disk regardless of a fact whether the disk has been recorded or not. If the guide detection signal cannot normally be detected, the output pulse from the pulse generator, which generates the pulses at each of a predetermined number of rotations, is received to control the rotations of the disk. Therefore, effect can be obtained in that excessive rotations, stop and inverse rotations of the disk can be prevented. Moreover, recording of data at an incorrect position and thus deletion of original data can be prevented.

According to another aspect of the present invention, rotations of the disk are precisely controlled in accordance with a signal synchronized with the reproduced signal from the disk in a pre-recorded region and recordable region. In the other regions, the rotations of the disk are controlled in accordance with the signal synchronized with the signal detected by the guide detection means. Therefore, malfunction occurring because the reproduced signal can appropriately be obtained in the regions except for the pre-recorded region and the recordable region can be prevented. If the recordable region cannot be specified, the signal synchronized with the pre-recorded region is used. In the other regions, the signal synchronized with the signal detected by the guide detection means is used to control the rotations of the disk.

According to another aspect of the present invention, the reproduced signal is selected in a region indicated by a signal which indicates the pre-recorded region. Therefore, data can accurately be read in the pre-recorded region. Thus, the rotations of the disk can precisely be controlled in accordance with the reproduced signal.

In the other regions, the rotations of the disk can be controlled even in a non-recorded region or the like from which the reproduced signal cannot be obtained in accordance with the signal generated by the first signal generating means and synchronized with the signal detected by the guide detection means. Moreover, data can be recorded on the generated accurate recordable region. If the synchronizing signals are not detected at predetermined intervals, the recording operation which is performed by the recording means is inhibited. Therefore, an effect can be obtained in that recording of data at an incorrect position and deletion of original data can be prevented.

According to another aspect of the present invention, when the difference in the count value of the writing address counter and the reading address counter is changed from a predetermined value, the error signal of the frequency is corrected. Thus, the rotations of the disk are changed and the updating speed of the writing address counter is changed. Then, the difference in the count value is restored to the predetermined value. Therefore, when the writing address counter is updated in synchronization with the synchronizing signal of the reproduced signal and the reading address counter is updated in synchronization with the reference signal, the difference in the count between the writing address counter and the reading address counter is enlarged. The value of the writing address counter and that of the reading address counter are made to be same. Thus, deletion of data which is being read is deleted with the data to be written can be prevented. Even if the difference in the count value is enlarged, the value of the writing address counter is not forcibly changed. Thus, an effect can be obtained in that the difference in the count value can be reduced by dint of the correction effect of the correction means.

According to another aspect of the present invention, the disk interruption means is provided which measures the frequency of the signals generated by the signal generating means at predetermined intervals of the signals divided by the frequency dividing means and which calculates and transmits, to the control means, time taken from start of the interrupting operation to stop of the disk when the rotational speed of the disk is made to be lower than a predetermined value. Therefore, the interruption time is not required to be programmed with software in an external microcomputer or the like. Thus, an effect can be obtained in that the apparatus can be provided which is able to automatically stop the disk and prevent malfunction, such as inverse rotations.

According to another aspect of the present invention, the selection means is provided which employs the third interruption means to interrupt rotations of the disk when a determination is made that the guide detection signal is not normally detected. Moreover, when the guide detection signal is normally detected and the synchronizing signals are not detected at predetermined intervals, the first interruption means is employed to stop the rotations of the disk. When the synchronizing signals are detected at predetermined intervals, the second interruption means is employed to stop the rotations of the disk. Therefore, an interruption means is selected to be suitable to the state of reproduction. Thus, an effect can be obtained in that the disk can accurately be stopped. Moreover, malfunction, such as inverse rotations, which occurs when the number of revolutions of the disk cannot normally be determined, can be prevented.

What is claimed is:

1. A disk-rotation control apparatus arranged to control rotation of a disk, comprising:

a signal generator generating a signal synchronized with a signal reproduced from the disk;

a frequency divider dividing a reference signal into signals each having a predetermined frequency;

a brake signal output selectively outputting brake signals to decelerate rotation of the disk in accordance with a braking operation;

a rotational speed detector measuring a number of revolutions of the disk in such a manner as to measure the frequency of the signal generated by said signal generator at each predetermined interval of the signals divided by said frequency divider and transmit a detection signal when the rotational speed of the disk has been made to be lower than a predetermined value; and a brake signal circuit measuring a time required from start of a braking operation to transmission of the detection signal from said rotational speed detector so as to control said brake signal output based on the measured time, said brake signal circuit including an updown counter that up counts to measure the time required from the start of the braking operation to the transmission of the detection signal and a selector that switches said updown counter from an up-count state to a down-count state after transmission of the detection signal, a number of down counts during the down-count state controlling a length of time that said brake signal output outputs brake signals to decelerate rotation of the disk.

2. A disk-rotation apparatus as claimed in claim 1, wherein said brake signal circuit sets a length of time that said brake signal output outputs brake signals to decelerate rotation of the disk as a function of the measured time.

3. A disk-rotation apparatus as claimed in claim 2, wherein the length of time set by said brake signal circuit is a multiple of the measured time.

4. A disk-rotation apparatus as claimed in claim 1, wherein the measured time signifies a time required to reduce rotational speed of the disk by one-third.

5. A disk-rotation control apparatus arranged to control rotation of a disk, comprising:

a pulse generator generating a pulse whenever the disk is rotated a predetermined amount;

a guide detector detecting at least one of a guide groove and guide land of the disk;

a first signal generator generating a signal synchronized with the signal detected by said guide detector;

a synchronizing-signal detector detecting synchronizing signals from a signal reproduced from the disk;

a second signal generator generating a signal synchronized with the reproduced signal;

a first determination unit determining whether or not the synchronizing signals detected by said synchronizing-signal detector are arranged at predetermined intervals;

a second determination unit determining whether or not a signal is normally detected by said guide detector;

a frequency divider dividing a reference signal into signals each having a predetermined frequency;

a first measuring unit measuring the number of revolutions of the disk in such a manner as to measure the frequency of the signal generated by said first signal generator at each predetermined interval of the signal divided by said frequency divider and transmit a detection signal when the rotational speed of the disk has been made to be lower than a predetermined value;

a second measuring unit measuring the number of revolutions of the disk in such a manner as to measure the frequency of the signal generated by said second signal generator at each predetermined interval of the signal divided by said frequency divider and transmit a detection signal when the rotational speed of the disk has been made to be lower than a predetermined value;

a third measuring unit measuring the number of revolutions in such a manner as to measure the pulses transmitted from said pulse generator at each predetermined interval of the signal divided by said frequency divider and transmit a detection signal with the rotational speed of the disk has been made to be lower than a predetermined value;

a brake signal output selectively outputting brake signals to decelerate rotation of the disk in accordance with a braking operation;

a first brake signal circuit measuring time required from start of a braking operation to transmission of the detection signal from said first measuring unit and selectively controlling said brake signal output based on the measured time;

a second brake signal circuit measuring time required from start of a braking operation to transmission of the detection signal from said second measuring unit and selectively controlling said brake signal output based on the measured time;

a third brake signal circuit measuring time required from start of a braking operation to transmission of the detection signal from said third measuring unit and selectively controlling said brake signal output of the disk based on the measured time; and a selector selecting any one of said first to third brake signal circuits in such a manner that when said second determination unit has determined that the signal is not detected normally by said guide detector, said third brake signal circuit is employed to control deceleration of the disk, when said second determination unit has determined that the signal is normally detected by said guide detector and when said first determination unit has determined that the synchronizing signals are not detected at the same intervals, said first brake signal circuit is employed to control deceleration of the disk and when said first determination unit has determined that the synchronizing signals are detected at predetermined intervals, said second brake signal circuit is employed to control deceleration of the disk.

6. A method of controlling rotation of a disk, comprising:

generating a synchronizing signal synchronized with a signal reproduced from the rotating disk;

dividing a reference signal into signals each having a predetermined frequency;

selectively outputting a brake signal to decelerate rotation of the disk in accordance with a braking operation;

measuring a number of revolutions of the disk to measure the frequency of the generated synchronizing signal at each predetermined interval of the signals having a predetermined frequency and transmit a detection signal when the rotational speed of the disk has been made to be lower than a predetermined value; and measuring a time required from start of the braking operation to transmission of the detection signal to control said selectively outputting a brake signal based on the measured time, wherein the time required from the start of the braking operation to the transmission of the detection signal is determined by an up-down counter, said up-down counter switching from an up-count state to a down-count state after transmission of the detection signal, a number of down-counts during the down-count state controlling a length of time that the brake signal is output to decelerate rotation of the disk.

7. The method as recited in claim 6, wherein said selectively outputting a brake signal is controlled by setting a length of time that the brake signal is output to decelerate rotation of the disk as a function of the measured time.

8. The method as recited in claim 7, wherein the set length of time is a multiple of the measured time.

9. The method as recited in claim 6, wherein the measured time signifies a time required to reduce rotational speed of the disk by one-third.

10. A method of controlling rotation of a disk, comprising:

(a) generating a pulse when the disk is rotated a predetermined amount;

(b) detecting at least one of a guide groove and guide land of the disk to provide a guide signal;

(c) generating a signal synchronized with the guide signal;

(d) detecting synchronizing signals from a signal reproduced from the disk;

(e) generating a signal synchronized with the reproduced signal;

(f) determining whether or not the detected synchronizing signals are arranged at predetermined intervals;

(g) determining whether or not a guide signal is normally detected;

(h) dividing a reference signal into signals each having a predetermined frequency;

(i) measuring the number of revolutions of the disk to measure the frequency of the signal synchronized with the guide signal at each predetermined interval of the divided reference signal and transmit a first detection signal when the rotational speed of the disk has been made to be lower than a predetermined value;

(j) measuring the number of revolutions of the disk to measure the frequency of the signal synchronized with the reproduced signal at each predetermined interval of the divided reference signal and transmit a second detection signal when the rotational speed of the disk has been made to be lower than a predetermined value;

(k) measuring the number of revolutions to measure the generated pulses at each predetermined interval of the divided reference signal and transmit a third detection signal with the rotational speed of the disk has been made to be lower than a predetermined value;

(l) selectively outputting a brake signal to decelerate rotation of the disk in accordance with a braking operation;

(m) measuring time required from start of a braking operation to transmission of the first detection signal and selectively controlling said braking operation based on the measured time;

(n) measuring time required from start of a braking operation to transmission of the second detection signal and selectively controlling said braking operation brake signal output based on the measured time;

(o) measuring time required from start of a braking operation to transmission of the third detection signal and selectively controlling said braking operation based on the measured time; and (p) selecting any one of the operations of (m), (n), and (o) for controlling said braking operation in such a manner that when the determination of (g) has determined that the guide signal is not detected normally, (o) is selected to control deceleration of the disk, when the determination of (g) has determined that the guide signal is normally detected and the determination of (f) has determined that the synchronizing signals are not detected at the predetermined intervals, (m) is selected to control deceleration of the disk, and when the determination of (f) has determined that the synchronizing signals are detected at predetermined intervals, (n) is selected to control deceleration of the disk.

* * * * *